US012060713B2

(12) United States Patent
Shiao et al.

(10) Patent No.: US 12,060,713 B2
(45) Date of Patent: *Aug. 13, 2024

(54) BUILDING MATERIALS COMPRISING GRAPHENE AND RELATED METHODS

(71) Applicant: BMIC LLC, Dallas, TX (US)

(72) Inventors: Ming-Liang Shiao, Basking Ridge, NJ (US); Luis Duque, Hackensack, NJ (US); Brian Lee, Cranford, NJ (US)

(73) Assignee: BMIC LLC, Dallas, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/849,329

(22) Filed: Jun. 24, 2022

(65) Prior Publication Data

US 2022/0412091 A1  Dec. 29, 2022

Related U.S. Application Data

(60) Provisional application No. 63/214,388, filed on Jun. 24, 2021.

(51) Int. Cl.
  *E04D 1/28* (2006.01)
  *C09D 195/00* (2006.01)
  *E04D 1/20* (2006.01)

(52) U.S. Cl.
  CPC ............ *E04D 1/28* (2013.01); *C09D 195/00* (2013.01); *E04D 1/20* (2013.01)

(58) Field of Classification Search
  CPC ............ E04D 1/28; E04D 1/20; C09D 195/00
  USPC ....................................................... 428/688
  See application file for complete search history.

(56) References Cited

U.S. PATENT DOCUMENTS

| | | | |
|---|---|---|---|
| 5,851,338 A | 12/1998 | Pushaw | |
| 5,932,134 A | 8/1999 | Christ et al. | |
| 5,955,188 A | 9/1999 | Pushaw | |
| 6,001,272 A | 12/1999 | Ikuma et al. | |
| 7,238,408 B2 | 7/2007 | Aschenbeck et al. | |
| 7,348,374 B2 | 3/2008 | Martinazzo | |
| 7,838,108 B2 | 11/2010 | Thiagarajan et al. | |
| 8,484,918 B2 | 7/2013 | Merkel | |
| 8,486,522 B2 | 7/2013 | Jokisch et al. | |
| 8,613,881 B2 | 12/2013 | Soong | |
| 8,753,473 B2 | 6/2014 | Merkel | |
| 8,968,853 B2 | 3/2015 | Zhou et al. | |
| 9,447,581 B2 | 9/2016 | Harrington et al. | |
| 9,523,203 B2 | 12/2016 | Zhou et al. | |
| 9,593,224 B2 | 3/2017 | Liu et al. | |
| 9,725,907 B2 | 8/2017 | Harrington et al. | |
| 9,920,200 B2* | 3/2018 | Zhou | C08K 3/04 |
| 9,944,793 B2 | 4/2018 | Eling et al. | |
| 10,155,866 B2 | 12/2018 | Le et al. | |
| 10,273,693 B2 | 4/2019 | Zhou et al. | |
| 10,391,676 B2 | 8/2019 | Tamai et al. | |
| 10,458,119 B2 | 10/2019 | Grubka et al. | |
| 10,538,683 B2 | 1/2020 | Lewis | |
| 10,834,584 B2 | 11/2020 | Shet et al. | |
| 11,565,970 B1 | 1/2023 | Shiao | |
| 2005/0072110 A1 | 4/2005 | Shiao et al. | |
| 2005/0123743 A1 | 6/2005 | Martinazzo | |
| 2007/0218250 A1* | 9/2007 | Kiik | B32B 11/02 428/143 |
| 2008/0187739 A1 | 8/2008 | Baker et al. | |
| 2008/0261471 A1 | 10/2008 | Chen et al. | |
| 2008/0265457 A1 | 10/2008 | McLeod et al. | |
| 2009/0029147 A1 | 1/2009 | Tang et al. | |
| 2009/0047502 A1 | 2/2009 | Folaron et al. | |
| 2009/0148665 A1 | 6/2009 | Thiagarajan et al. | |
| 2009/0317593 A1 | 12/2009 | Smith et al. | |
| 2010/0089002 A1 | 4/2010 | Merkel | |
| 2011/0008622 A1 | 1/2011 | Kalkanoglu et al. | |
| 2012/0034424 A1 | 2/2012 | Hong et al. | |
| 2012/0092105 A1 | 4/2012 | Weinberg et al. | |
| 2013/0295338 A1 | 11/2013 | Keating et al. | |
| 2013/0337258 A1 | 12/2013 | Schwendeman et al. | |
| 2014/0124977 A1 | 5/2014 | Merkel | |
| 2015/0210599 A1 | 7/2015 | Nozato et al. | |
| 2015/0252566 A1 | 9/2015 | Tangeman et al. | |
| 2015/0259919 A1 | 9/2015 | Lewis | |
| 2015/0307668 A1 | 10/2015 | Kalgutkar et al. | |

(Continued)

FOREIGN PATENT DOCUMENTS

WO    2021/212155 A1    10/2021

OTHER PUBLICATIONS

Alltimes Coatings, Dec. 15, 2020. (Year: 2020).*
Lin et al., "Orientation Control of Graphene Flakes by Magnetic Field: Broad Device Applications of Macroscopically Aligned Graphene", Advanced Materials, Nov. 2016.
Tian et al., "Magnetically-induced alignment of graphene via Landau diamagnetism," Carbon 131 (2018) 66-71.
Zurutuza, "Graphene & Graphite—How Do They Compare?", Graphenea, Apr. 16, 2021.
"What is Graphene and How Can It Protect Metal Roofs?"; Alltime Coatings: Dec. 15, 2020.

*Primary Examiner* — Hui H Chin

(74) *Attorney, Agent, or Firm* — GREENBERG TRAURIG, LLP

(57) ABSTRACT

Some embodiments of the present disclosure relate to a roofing shingle comprising a substrate, wherein the substrate having a top surface and a bottom surface; and a material layer, wherein the material layer comprises graphene, wherein the material layer is disposed on or above the top surface of the substrate. Some embodiments of the present disclosure relate to a method comprising one or more of obtaining a substrate, wherein the substrate having a top surface and a bottom surface; obtaining a graphene composition, wherein the graphene composition comprises at least graphene; and applying the graphene composition to the top surface of the substrate or a surface above the top surface of the substrate to obtain a material layer comprising graphene.

20 Claims, 6 Drawing Sheets

(56) References Cited

U.S. PATENT DOCUMENTS

| | | |
|---|---|---|
| 2015/0346398 A1 | 12/2015 | Gorodetsky et al. |
| 2017/0246659 A1 | 8/2017 | Becker, IV |
| 2017/0326823 A1 | 11/2017 | Kushalappa et al. |
| 2018/0187419 A1 | 7/2018 | Lai et al. |
| 2019/0153722 A1 | 5/2019 | Schmetzer et al. |
| 2020/0224419 A1 | 7/2020 | Boss et al. |
| 2021/0040743 A1 | 2/2021 | Boss et al. |
| 2021/0276920 A1 | 9/2021 | Kondratowicz et al. |
| 2021/0292491 A1 | 9/2021 | Ouchiyara et al. |

* cited by examiner

BUILDING MATERIALS COMPRISING GRAPHENE AND RELATED METHODS

FIELD

This disclosure generally relates to building materials comprising graphene and related methods.

BACKGROUND

The dark colored surface of asphaltic roofing materials leads to elevated roofing temperatures and, consequently, greater energy requirements to cool the spaces covered by the asphaltic roofing materials. In addition, asphaltic roofing materials are susceptible not only to degradation resulting from oxidation of asphalt, but also undesirable discoloration resulting from the high staining potential of asphalt.

SUMMARY

Some embodiments relate to a roofing shingle. In some embodiments, the roofing shingle comprises a substrate. In some embodiments, the substrate having a top surface and a bottom surface. In some embodiments, the roofing shingle comprises a material layer. In some embodiments, the material layer is disposed on or above the top surface of the substrate. In some embodiments, the roofing shingle comprises a coating layer. In some embodiments, the coating layer is disposed between the top surface of the substrate and the material layer.

In some embodiments, the substrate does not comprise graphene.

In some embodiments, the substrate comprises asphalt.

In some embodiments, the substrate does not comprise asphalt.

In some embodiments, the material layer comprises graphene.

In some embodiments, the material layer further comprises asphalt.

In some embodiments, the material layer does not comprise asphalt.

In some embodiments, the material layer further comprises at least one additive.

In some embodiments, the coating layer comprises asphalt.

In some embodiments, the at least one additive is present in an amount of 80% to 99.9% by weight based on a total weight of the material layer.

In some embodiments, the at least one additive comprises at least one of a dispersing agent, an adhesion promoter, a colorant, a viscosity modifier, a filler, an opacifier, an ultraviolet (UV) absorber, a cross-linking agent, or any combination thereof.

In some embodiments, a thickness of the material layer is 1 mil to 500 mils.

In some embodiments, a lateral size of the graphene is 5 nm to 800 μm.

In some embodiments, the graphene is present in an amount of 0.1% to 10% by weight based on a total weight of the material layer.

In some embodiments, the material layer has a viscosity of 8000 cP or less as measured according to ASTM D2196 using a RV3 viscometer spindle at 50 rpm and 23° C.

In some embodiments, the material layer covers at least 50% of the top surface of the substrate or a surface above the top surface of the substrate.

In some embodiments, the roofing shingle having a total solar reflectance greater than a total solar reflectance of a roofing shingle control, as measured according to ASTM C1549.

In some embodiments, the roofing shingle having a CIELAB color value comprising an L* value of 50 or less.

In some embodiments, the CIELAB color value comprises an L value range of 0<L*<40.

In some embodiments, the roofing shingle does not comprise roofing granules.

Some embodiments relate to a method. In some embodiments, the method comprises obtaining a substrate. In some embodiments, the substrate having a top surface and a bottom surface. In some embodiments, the method comprises obtaining a graphene composition. In some embodiments, the graphene composition comprises graphene. In some embodiments, the method comprises applying the graphene composition to the top surface of the substrate or a surface above the top surface of the substrate, so as to obtain a material layer comprising or consisting of graphene. In some embodiments, the method comprises applying a coating composition to the top surface of the substrate, so as to obtain a coating layer (e.g., an asphalt filled coating). In some embodiments, the coating layer comprises asphalt. In some embodiments, the method comprises, prior to applying the graphene composition, heating the substrate to a first temperature from a room temperature. In some embodiments, the first temperature is greater than the room temperature. In some embodiments, the first temperature is 100° F. to 150° F.

In some embodiments, the graphene composition comprises graphene and molten asphalt.

In some embodiments, obtaining the graphene composition comprises dispersing graphene in at least one of a liquid media, at least one additive, or any combination thereof.

In some embodiments, applying the graphene composition comprises an electrostatic deposition of the graphene onto the top surface of the substrate.

In some embodiments, applying the graphene composition comprises at least one of a brushing on application, a roll transfer application, a fabric roll application, or an air brush application.

BRIEF DESCRIPTION OF THE DRAWINGS

Reference is made to the drawings that form a part of this disclosure, and which illustrate embodiments in which the materials and methods described herein can be practiced.

DETAILED DESCRIPTION

Figure 1:
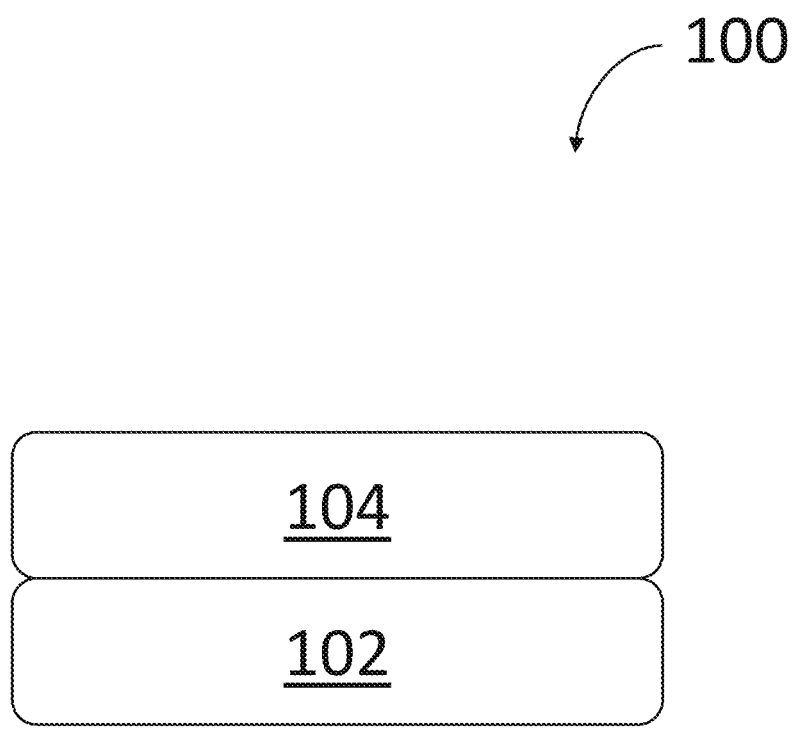
FIG. 1 is a schematic diagram of a roofing shingle, according to some embodiments of the present disclosure.

Some embodiments of the present disclosure relate to building materials comprising graphene.

As used herein, the term "building material" includes, without limitation, roofing materials, siding, and flooring.

As used herein, the term "roofing material" includes, without limitation, shingles, waterproofing membranes, underlayments, and tiles. For example, in some embodiments, a roofing shingle is an asphalt roofing shingle.

As used herein, the term "graphene" refers to a type of carbon nanomaterial. For example, in some embodiments, the term graphene refers to a two-dimensional arrangement of carbon atoms (i.e., a single layer of atoms arranged in a two-dimensional honeycomb lattice).

In some embodiments, the building materials comprising graphene comprise a roofing shingle comprising graphene. In some embodiments, the roofing shingle comprising graphene comprises, consists of, or consists essentially of at least one of a substrate, at least one layer, or any combination thereof. In some embodiments, the at least one layer comprises, consists of, or consists essentially of at least one of a material layer, a coating layer, or any combination thereof.

In some embodiments, a roofing shingle comprises, consists of, or consists essentially of a substrate, wherein the substrate having a top surface and a bottom surface, and at least one layer, wherein the at least one layer comprises at least one of a material layer, a coating layer, or any combination thereof. In some embodiments, the at least one layer is disposed on or above the top surface of the substrate. For example, in some embodiments, the at least one layer is disposed on the top surface of the substrate or on a surface above the top surface of the substrate. In some embodiments, the at least one layer comprises at least a material layer, wherein the material layer is disposed on the top surface of the substrate. In other embodiments, the material layer is disposed on a surface above the top surface of the substrate. For example, in some embodiments, a coating layer is disposed on the top surface of the substrate, wherein the coating layer having a top surface and a bottom surface, and the material layer is disposed on the top surface of the coating layer (e.g., a surface above the top surface of the substrate). In some of these embodiments, the coating layer is disposed between the substrate (e.g., the top surface of the substrate) and the material layer. In some embodiments, the roofing shingle does not comprise roofing granules. In some embodiments, the roofing shingle does not comprise an infrared reflective pigment.

In some embodiments, the substrate comprises at least one of a plywood substrate, a glass substrate, a cellulosic substrate, a roofing shingle, a polyester, a fiberglass, a glass mat, a fiberglass mat, an underlayment, a roofing membrane, a roof deck, a photovoltaic (PV) panel, a modified bitumen (MODBIT) substrate, a roll good, a board (such as but not limited to a foam board (e.g., a polyisocyanurate (ISO) foam board), a cover board, any combination thereof), a pipe, a base sheet, a chimney, a wax paper, or any combination thereof.

In some embodiments, at least one of the substrate, the material layer, the coating layer, or any combination thereof may each independently comprise, consist of, or consist essentially of at least one of graphene, asphalt, at least one additive, or any combination thereof. In some embodiments, the substrate comprises, consists of, or consists essentially of graphene. In some embodiments, the substrate comprises, consists of, or consists essentially of asphalt. In some embodiments, the substrate comprises, consists of, or consists essentially of graphene and asphalt. In some embodiments, the material layer comprises, consists of, or consists essentially of graphene. In some embodiments, the material layer comprises, consists of, or consists essentially of asphalt. In some embodiments, the material layer comprises, consists of, or consists essentially of graphene and asphalt. In some embodiments, the coating layer comprises, consists of, or consists essentially of graphene. In some embodiments, the coating layer comprises, consists of, or consists essentially of asphalt. In some embodiments, the coating layer comprises, consists of, or consists essentially of graphene and asphalt. In some embodiments, the coating layer is an asphalt filled coating. In some embodiments, the asphalt filled coating comprises an asphalt and at least one filler. In some embodiments, the asphalt filled coating comprises 10% to 90% by weight of an asphalt and 10% to 90% by weight of at least one filler. In some embodiments, weight percentages are based on a total weight of the asphalt filled coating.

In some embodiments, at least one of the substrate, the material layer, the coating layer, or any combination thereof does not comprise at least one of graphene, asphalt, or any combination thereof. In some embodiments, the substrate does not comprise graphene. In some embodiments, the substrate does not comprise graphite. In some embodiments, the substrate does not comprise asphalt. In some embodiments, the substrate does not comprise graphene and does not comprise asphalt. In some embodiments, the material layer does not comprise graphene. In some embodiments, the material layer does not comprise asphalt. In some embodiments, the material layer does not comprise graphene and does not comprise asphalt. In some embodiments, the coating layer does not comprise graphene. In some embodiments, the coating layer does not comprise asphalt. In some embodiments, the coating layer does not comprise graphene and does not comprise asphalt.

In some embodiments, at least one of the graphene, the asphalt, or any combination thereof is present in an amount of less than 35% by weight based on a total weight of at least one of the substrate, the material layer, the coating layer, or any combination thereof. In some embodiments, at least one of the graphene, the asphalt, or any combination thereof is present in an amount of less than 30% by weight based on the total weight of at least one of the substrate, the material layer, the coating layer, or any combination thereof. In some embodiments, at least one of the graphene, the asphalt, or any combination thereof is present in an amount of less than 25% by weight based on the total weight of at least one of the substrate, the material layer, the coating layer, or any combination thereof. In some embodiments, at least one of the graphene, the asphalt, or any combination thereof is present in an amount of less than 20% by weight based on the total weight of at least one of the substrate, the material layer, the coating layer, or any combination thereof. In some embodiments, at least one of the graphene, the asphalt, or any combination thereof is present in an amount of less than 15% by weight based on the total weight of at least one of the substrate, the material layer, the coating layer, or any combination thereof. In some embodiments, at least one of the graphene, the asphalt, or any combination thereof is present in an amount of less than 10% by weight based on the total weight of at least one of the substrate, the material layer, the coating layer, or any combination thereof. In some embodiments, at least one of the graphene, the asphalt, or any combination thereof is present in an amount of less than 5% by weight based on the total weight of at least one of the substrate, the material layer, the coating layer, or any combination thereof. In some embodiments, at least one of the graphene, the asphalt, or any combination thereof is present in an amount of less than 4% by weight based on the total weight of at least one of the substrate, the material layer, the coating layer, or any combination thereof. In some embodiments, at least one of the graphene, the asphalt, or any combination thereof is present in an amount of less than 3% by weight based on the total weight of at least one of the substrate, the material layer, the coating layer, or any combination thereof. In some embodiments, at least one of the graphene, the asphalt, or any combination thereof is present in an amount of less than 2% by weight based on the total weight of at least one of the substrate, the material layer, the coating layer, or any combination thereof. In some embodiments, at least one of the graphene, the asphalt, or any combination thereof is present in an amount of less than 1% by weight based on the total weight of at least one of the substrate, the material layer, the coating layer, or any combination thereof. In some embodiments, at least one of the graphene, the asphalt, or any combination thereof is present in an amount of less than 0.5% by weight based on the total weight of at least one of the substrate, the material layer, the coating layer, or any combination thereof. In some embodiments, at least one of the graphene, the asphalt, or any combination thereof is present in an amount of less than 0.1% by weight based on the total weight of at least one of the substrate, the material layer, the coating layer, or any combination thereof.

In some embodiments, the asphalt is present in an amount of 10% to 90% by weight based on a total weight of at least one of the substrate, the coating layer, the material layer, or any combination thereof. In some embodiments, the asphalt is present in an amount of 15% to 90% by weight based on the total weight of at least one of the substrate, the coating layer, the material layer, or any combination thereof. In some embodiments, the asphalt is present in an amount of 20% to 90% by weight based on the total weight of at least one of the substrate, the coating layer, the material layer, or any combination thereof. In some embodiments, the asphalt is present in an amount of 25% to 90% by weight based on the total weight of at least one of the substrate, the coating layer, the material layer, or any combination thereof. In some embodiments, the asphalt is present in an amount of 30% to 90% by weight based on the total weight of at least one of the substrate, the coating layer, the material layer, or any combination thereof. In some embodiments, the asphalt is present in an amount of 35% to 90% by weight based on the total weight of at least one of the substrate, the coating layer, the material layer, or any combination thereof. In some embodiments, the asphalt is present in an amount of 40% to 90% by weight based on the total weight of at least one of the substrate, the coating layer, the material layer, or any combination thereof. In some embodiments, the asphalt is present in an amount of 45% to 90% by weight based on the total weight of at least one of the substrate, the coating layer, the material layer, or any combination thereof. In some embodiments, the asphalt is present in an amount of 50% to 90% by weight based on the total weight of at least one of the substrate, the coating layer, the material layer, or any combination thereof. In some embodiments, the asphalt is present in an amount of 55% to 90% by weight based on the total weight of at least one of the substrate, the coating layer, the material layer, or any combination thereof. In some embodiments, the asphalt is present in an amount of 60% to 90% by weight based on the total weight of at least one of the substrate, the coating layer, the material layer, or any combination thereof. In some embodiments, the asphalt is present in an amount of 65% to 90% by weight based on the total weight of at least one of the substrate, the coating layer, the material layer, or any combination thereof. In some embodiments, the asphalt is present in an amount of 70% to 90% by weight based on the total weight of at least one of the substrate, the coating layer, the material layer, or any combination thereof. In some embodiments, the asphalt is present in an amount of 75% to 90% by weight based on the total weight of at least one of the substrate, the coating layer, the material layer, or any combination thereof. In some embodiments, the asphalt is present in an amount of 80% to 90% by weight based on the total weight of at least one of the substrate, the coating layer, the material layer, or any combination thereof. In some embodiments, the asphalt is present in an amount of 85% to 90% by weight based on the total weight of at least one of the substrate, the coating layer, the material layer, or any combination thereof.

In some embodiments, the asphalt is present in an amount of 10% to 85% by weight based on a total weight of at least one of the substrate, the coating layer, the material layer, or any combination thereof. In some embodiments, the asphalt is present in an amount of 10% to 80% by weight based on the total weight of at least one of the substrate, the coating layer, the material layer, or any combination thereof. In some embodiments, the asphalt is present in an amount of 10% to 75% by weight based on the total weight of at least one of the substrate, the coating layer, the material layer, or any combination thereof. In some embodiments, the asphalt is present in an amount of 10% to 70% by weight based on the total weight of at least one of the substrate, the coating layer, the material layer, or any combination thereof. In some embodiments, the asphalt is present in an amount of 10% to 65% by weight based on the total weight of at least one of the substrate, the coating layer, the material layer, or any combination thereof. In some embodiments, the asphalt is present in an amount of 10% to 60% by weight based on the total weight of at least one of the substrate, the coating layer, the material layer, or any combination thereof. In some embodiments, the asphalt is present in an amount of 10% to 55% by weight based on the total weight of at least one of the substrate, the coating layer, the material layer, or any combination thereof. In some embodiments, the asphalt is present in an amount of 10% to 50% by weight based on the total weight of at least one of the substrate, the coating layer, the material layer, or any combination thereof. In some embodiments, the asphalt is present in an amount of 10% to 45% by weight based on the total weight of at least one of the substrate, the coating layer, the material layer, or any combination thereof. In some embodiments, the asphalt is present in an amount of 10% to 40% by weight based on the total weight of at least one of the substrate, the coating layer, the material layer, or any combination thereof. In some embodiments, the asphalt is present in an amount of 10% to 35% by weight based on the total weight of at least one of the substrate, the coating layer, the material layer, or any combination thereof. In some embodiments, the asphalt is present in an amount of 10% to 30% by weight based on the total weight of at least one of the substrate, the coating layer, the material layer, or any combination thereof. In some embodiments, the asphalt is present in an amount of 10% to 25% by weight based on the total weight of at least one of the substrate, the coating layer, the material layer, or any combination thereof. In some embodiments, the asphalt is present in an amount of 10% to 20% by weight based on the total weight of at least one of the substrate, the coating layer, the material layer, or any combination thereof. In some embodiments, the asphalt is present in an amount of 10% to 15% by weight based on the total weight of at least one of the substrate, the coating layer, the material layer, or any combination thereof.

In some embodiments, the graphene is present in an amount of 0.0001% to 20% by weight based on a total weight of the material layer. In some embodiments, the graphene is present in an amount of 0.1% to 19% by weight based on the total weight of the material layer. In some embodiments, the graphene is present in an amount of 0.1% to 18% by weight based on the total weight of the material layer. In some embodiments, the graphene is present in an amount of 0.1% to 17% by weight based on the total weight of the material layer. In some embodiments, the graphene is present in an amount of 0.1% to 16% by weight based on the total weight of the material layer. In some embodiments, the graphene is present in an amount of 0.1% to 15% by weight based on the total weight of the material layer. In some embodiments, the graphene is present in an amount of 0.1% to 14% by weight based on the total weight of the material layer. In some embodiments, the graphene is present in an amount of 0.1% to 13% by weight based on the total weight of the material layer. In some embodiments, the graphene is present in an amount of 0.1% to 12% by weight based on the total weight of the material layer. In some embodiments, the graphene is present in an amount of 0.1% to 11% by weight based on the total weight of the material layer. In some embodiments, the graphene is present in an amount of 0.1% to 10% by weight based on the total weight of the material layer. In some embodiments, the graphene is present in an amount of 0.1% to 9% by weight based on the total weight of the material layer. In some embodiments, the graphene is present in an amount of 0.1% to 8% by weight based on the total weight of the material layer. In some embodiments, the graphene is present in an amount of 0.1% to 7% by weight based on the total weight of the material layer. In some embodiments, the graphene is present in an amount of 0.1% to 6% by weight based on the total weight of the material layer. In some embodiments, the graphene is present in an amount of 0.1% to 5% by weight based on the total weight of the material layer. In some embodiments, the graphene is present in an amount of 0.1% to 4% by weight based on the total weight of the material layer. In some embodiments, the graphene is present in an amount of 0.1% to 3% by weight based on the total weight of the material layer. In some embodiments, the graphene is present in an amount of 0.1% to 2% by weight based on the total weight of the material layer. In some embodiments, the graphene is present in an amount of 0.1% to 1.9% by weight based on the total weight of the material layer. In some embodiments, the graphene is present in an amount of 0.1% to 1.8% by weight based on the total weight of the material layer. In some embodiments, the graphene is present in an amount of 0.1% to 1.7% by weight based on the total weight of the material layer. In some embodiments, the graphene is present in an amount of 0.1% to 1.6% by weight based on the total weight of the material layer. In some embodiments, the graphene is present in an amount of 0.1% to 1.5% by weight based on the total weight of the material layer. In some embodiments, the graphene is present in an amount of 0.1% to 1.4% by weight based on the total weight of the material layer. In some embodiments, the graphene is present in an amount of 0.1% to 1.3% by weight based on the total weight of the material layer. In some embodiments, the graphene is present in an amount of 0.1% to 1.2% by weight based on the total weight of the material layer. In some embodiments, the graphene is present in an amount of 0.1% to 1.1% by weight based on the total weight of the material layer. In some embodiments, the graphene is present in an amount of 0.1% to 1% by weight based on the total weight of the material layer. In some embodiments, the graphene is present in an amount of 0.1% to 0.9% by weight based on the total weight of the material layer. In some embodiments, the graphene is present in an amount of 0.1% to 0.8% by weight based on the total weight of the material layer. In some embodiments, the graphene is present in an amount of 0.1% to 0.7% by weight based on the total weight of the material layer. In some embodiments, the graphene is present in an amount of 0.1% to 0.6% by weight based on the total weight of the material layer. In some embodiments, the graphene is present in an amount of 0.1% to 0.5% by weight based on the total weight of the material layer. In some embodiments, the graphene is present in an amount of 0.1% to 0.4% by weight based on the total weight of the material layer. In some embodiments, the graphene is present in an amount of 0.1% to 0.3% by weight based on the total weight of the material layer. In some embodiments, the graphene is present in an amount of 0.1% to 0.2% by weight based on the total weight of the material layer. In some embodiments, the weight percentages of the graphene provided above are based on the total weight of the substrate. In some embodiments, the weight percentages of the graphene provided above are based on the total weight of the coating layer.

In some embodiments, the graphene is present in an amount of 0.1% to 5% by weight based on the total weight of the material layer. In some embodiments, the graphene is present in an amount of 0.2% to 5% by weight based on the total weight of the material layer. In some embodiments, the graphene is present in an amount of 0.3% to 5% by weight based on the total weight of the material layer. In some embodiments, the graphene is present in an amount of 0.4% to 5% by weight based on the total weight of the material layer. In some embodiments, the graphene is present in an amount of 0.5% to 5% by weight based on the total weight of the material layer. In some embodiments, the graphene is present in an amount of 0.6% to 5% by weight based on the total weight of the material layer. In some embodiments, the graphene is present in an amount of 0.7% to 5% by weight based on the total weight of the material layer. In some embodiments, the graphene is present in an amount of 0.8% to 5% by weight based on the total weight of the material layer. In some embodiments, the graphene is present in an amount of 0.9% to 5% by weight based on the total weight of the material layer. In some embodiments, the graphene is present in an amount of 1% to 5% by weight based on the total weight of the material layer. In some embodiments, the graphene is present in an amount of 1.1% to 5% by weight based on the total weight of the material layer. In some embodiments, the graphene is present in an amount of 1.2% to 5% by weight based on the total weight of the material layer. In some embodiments, the graphene is present in an amount of 1.3% to 5% by weight based on the total weight of the material layer. In some embodiments, the graphene is present in an amount of 1.4% to 5% by weight based on the total weight of the material layer. In some embodiments, the graphene is present in an amount of 1.5% to 5% by weight based on the total weight of the material layer. In some embodiments, the graphene is present in an amount of 1.6% to 5% by weight based on the total weight of the material layer. In some embodiments, the graphene is present in an amount of 1.7% to 5% by weight based on the total weight of the material layer. In some embodiments, the graphene is present in an amount of 1.8% to 5% by weight based on the total weight of the material layer. In some embodiments, the graphene is present in an amount of 1.9% to 5% by weight based on the total weight of the material layer. In some embodiments, the graphene is present in an amount of 2% to 5% by weight based on the total weight of the material layer.

In some embodiments, the graphene is present in an amount of 2.1% to 5% by weight based on the total weight of the material layer. In some embodiments, the graphene is present in an amount of 2.2% to 5% by weight based on the total weight of the material layer. In some embodiments, the graphene is present in an amount of 2.3% to 5% by weight based on the total weight of the material layer. In some embodiments, the graphene is present in an amount of 2.4% to 5% by weight based on the total weight of the material layer. In some embodiments, the graphene is present in an amount of 2.5% to 5% by weight based on the total weight of the material layer. In some embodiments, the graphene is present in an amount of 2.6% to 5% by weight based on the total weight of the material layer. In some embodiments, the graphene is present in an amount of 2.7% to 5% by weight based on the total weight of the material layer. In some embodiments, the graphene is present in an amount of 2.8% to 5% by weight based on the total weight of the material layer. In some embodiments, the graphene is present in an amount of 2.9% to 5% by weight based on the total weight of the material layer. In some embodiments, the graphene is present in an amount of 3.0% to 5% by weight based on the total weight of the material layer. In some embodiments, the graphene is present in an amount of 3.1% to 5% by weight based on the total weight of the material layer. In some embodiments, the graphene is present in an amount of 3.2% to 5% by weight based on the total weight of the material layer. In some embodiments, the graphene is present in an amount of 3.3% to 5% by weight based on the total weight of the material layer. In some embodiments, the graphene is present in an amount of 3.4% to 5% by weight based on the total weight of the material layer. In some embodiments, the graphene is present in an amount of 3.5% to 5% by weight based on the total weight of the material layer. In some embodiments, the graphene is present in an amount of 3.6% to 5% by weight based on the total weight of the material layer. In some embodiments, the graphene is present in an amount of 3.7% to 5% by weight based on the total weight of the material layer. In some embodiments, the graphene is present in an amount of 3.8% to 5% by weight based on the total weight of the material layer. In some embodiments, the graphene is present in an amount of 3.9% to 5% by weight based on the total weight of the material layer. In some embodiments, the graphene is present in an amount of 4.0% to 5% by weight based on the total weight of the material layer. In some embodiments, the graphene is present in an amount of 4.1% to 5% by weight based on the total weight of the material layer. In some embodiments, the graphene is present in an amount of 4.2% to 5% by weight based on the total weight of the material layer. In some embodiments, the graphene is present in an amount of 4.3% to 5% by weight based on the total weight of the material layer. In some embodiments, the graphene is present in an amount of 4.4% to 5% by weight based on the total weight of the material layer. In some embodiments, the graphene is present in an amount of 4.5% to 5% by weight based on the total weight of the material layer. In some embodiments, the graphene is present in an amount of 4.6% to 5% by weight based on the total weight of the material layer. In some embodiments, the graphene is present in an amount of 4.7% to 5% by weight based on the total weight of the material layer. In some embodiments, the graphene is present in an amount of 4.8% to 5% by weight based on the total weight of the material layer. In some embodiments, the graphene is present in an amount of 4.9% to 5% by weight based on the total weight of the material layer. In some embodiments, the weight percentages of the graphene provided above are based on the total weight of the substrate. In some embodiments, the weight percentages of the graphene provided above are based on the total weight of the coating layer.

In some embodiments, the graphene is present in an amount of 0.1% to 2% by weight based on the total weight of the material layer. In some embodiments, the graphene is present in an amount of 0.2% to 2% by weight based on the total weight of the material layer. In some embodiments, the graphene is present in an amount of 0.3% to 2% by weight based on the total weight of the material layer. In some embodiments, the graphene is present in an amount of 0.4% to 2% by weight based on the total weight of the material layer. In some embodiments, the graphene is present in an amount of 0.5% to 2% by weight based on the total weight of the material layer. In some embodiments, the graphene is present in an amount of 0.6% to 2% by weight based on the total weight of the material layer. In some embodiments, the graphene is present in an amount of 0.7% to 2% by weight based on the total weight of the material layer. In some embodiments, the graphene is present in an amount of 0.8% to 2% by weight based on the total weight of the material layer. In some embodiments, the graphene is present in an amount of 0.9% to 2% by weight based on the total weight of the material layer. In some embodiments, the graphene is present in an amount of 1% to 2% by weight based on the total weight of the material layer. In some embodiments, the graphene is present in an amount of 1.1% to 2% by weight based on the total weight of the material layer. In some embodiments, the graphene is present in an amount of 1.2% to 2% by weight based on the total weight of the material layer. In some embodiments, the graphene is present in an amount of 1.3% to 2% by weight based on the total weight of the material layer. In some embodiments, the graphene is present in an amount of 1.4% to 2% by weight based on the total weight of the material layer. In some embodiments, the graphene is present in an amount of 1.5% to 2% by weight based on the total weight of the material layer. In some embodiments, the graphene is present in an amount of 1.6% to 2% by weight based on the total weight of the material layer. In some embodiments, the graphene is present in an amount of 1.7% to 2% by weight based on the total weight of the material layer. In some embodiments, the graphene is present in an amount of 1.8% to 2% by weight based on the total weight of the material layer. In some embodiments, the graphene is present in an amount of 1.9% to 2% by weight based on the total weight of the material layer. In some embodiments, the weight percentages of the graphene provided above are based on the total weight of the substrate. In some embodiments, the weight percentages of the graphene provided above are based on the total weight of the coating layer.

In some embodiments, the material layer is a layer comprising graphene as a majority component (e.g., >50% by weight based on the total weight of the material layer). For example, in some embodiments, the graphene is present in an amount of 50% to 100% by weight based on the total weight of the material layer. In some embodiments, the graphene is present in an amount of 55% to 100% by weight based on the total weight of the material layer. In some embodiments, the graphene is present in an amount of 60% to 100% by weight based on the total weight of the material layer. In some embodiments, the graphene is present in an amount of 65% to 100% by weight based on the total weight of the material layer. In some embodiments, the graphene is present in an amount of 70% to 100% by weight based on the total weight of the material layer. In some embodiments, the graphene is present in an amount of 75% to 100% by weight based on the total weight of the material layer. In some embodiments, the graphene is present in an amount of 80% to 100% by weight based on the total weight of the material layer. In some embodiments, the graphene is present in an amount of 55% to 95% by weight based on the total weight of the material layer. In some embodiments, the graphene is present in an amount of 55% to 90% by weight based on the total weight of the material layer. In some embodiments, the graphene is present in an amount of 55% to 85% by weight based on the total weight of the material layer. In some embodiments, the graphene is present in an amount of 55% to 80% by weight based on the total weight of the material layer. In some embodiments, the graphene is present in an amount of 55% to 75% by weight based on the total weight of the material layer.

In some embodiments, the graphene is present in a form of a powder, a pellet, a flake, a rod, a fiber, or any combination thereof. For example, in some embodiments, the graphene includes graphene particles, such as for example graphene nanoparticles. In some embodiments, graphene is combined with or replaced by at least one other carbon nanomaterial. Examples of carbon nanomaterials include, without limitation, graphene, graphite, carbon nanostructures (e.g., carbon nanotubes, etc.), fullerenes, or any combination thereof. In some embodiments, graphene is combined with or replaced by at least one of a graphene, a graphite, a carbon nanotube, a fullerene, a composite thereof, or any combination thereof. In some embodiments, the term graphene refers to graphene combined with at least one of a graphite, a carbon nanotube, a fullerene or any combination thereof to form a composite. In some embodiments, the term graphene does not refer to a graphite.

In some embodiments, the graphene is directly exposed to an environment. In some embodiments, the environment is an outdoor environment. In some embodiments, the environment is ambient condition(s).

As used herein, the term "lateral size" refers to an average dimension of at least a portion of the graphene. In some embodiments, the term lateral size refers to an average particle size of the graphene. In some embodiments, the lateral size of graphene depends on a shape or a general shape of the graphene, a form of the graphene (e.g., as a powder, a pellet, a sheet, etc.), a type of the graphene (e.g., carbon nanotubes, graphite, etc.), or any combination thereof. In some embodiments, for example, the lateral size of graphene refers to at least one of a radius, a diameter, a length, a width, a diagonal, or any combination thereof.

In some embodiments, a lateral size of the graphene is 0.01 nm to 800 µm. In some embodiments, the lateral size of the graphene is 800 µm or less. In some embodiments, the lateral size of the graphene is 600 µm or less. In some embodiments, the lateral size of the graphene is 500 µm or less. In some embodiments, the lateral size of the graphene is 400 µm or less. In some embodiments, the lateral size of the graphene is 300 µm or less. In some embodiments, the lateral size of the graphene is 200 µm or less. In some embodiments, the lateral size of the graphene is 0.01 nm to 800 nm. In some embodiments, the lateral size of the graphene is 5 nm to 800 nm. In some embodiments, the lateral size of the graphene is 10 nm to 500 nm. In some embodiments, the lateral size of the graphene is 10 nm to 400 nm. In some embodiments, the lateral size of the graphene is 10 nm to 200 nm. In some embodiments, the lateral size of the graphene is 5 nm to 150 nm. In some embodiments, the lateral size of the graphene is 10 nm to 500 µm. In some embodiments, the lateral size of the graphene is 50 nm to 500 µm. In some embodiments, the lateral size of the graphene is 100 nm to 500 µm. In some embodiments, the lateral size of the graphene is 200 nm to 500 µm. In some embodiments, the lateral size of the graphene is 200 nm to 20 µm. In some embodiments, the lateral size of the graphene is 500 nm to 5 µm. In some embodiments, the lateral size of the graphene is 5 µm to 20 µm. In some embodiments, the lateral size of the graphene is 200 nm to 500 nm. In some embodiments, the lateral size of the graphene is 0.5 µm to 5 µm.

In some embodiments, the material layer covers at least a portion of the top surface of the substrate or the surface above the top surface of the substrate. In some embodiments, the material layer covers at least 50% of the top surface of the substrate or the surface above the top surface of the substrate. In some embodiments, the material layer covers at least 55% of the top surface of the substrate or the surface above the top surface of the substrate. In some embodiments, the material layer covers at least 60% of the top surface of the substrate or the surface above the top surface of the substrate. In some embodiments, the material layer covers at least 65% of the top surface of the substrate or the surface above the top surface of the substrate. In some embodiments, the material layer covers at least 70% of the top surface of the substrate or the surface above the top surface of the substrate. In some embodiments, the material layer covers at least 75% of the top surface of the substrate or the surface above the top surface of the substrate. In some embodiments, the material layer covers at least 80% of the top surface of the substrate or the surface above the top surface of the substrate. In some embodiments, the material layer covers at least 85% of the top surface of the substrate or the surface above the top surface of the substrate. In some embodiments, the material layer covers at least 90% of the top surface of the substrate or the surface above the top surface of the substrate. In some embodiments, the material layer covers at least 95% of the top surface of the substrate or the surface above the top surface of the substrate.

In some embodiments, the material layer covers 50% to 100% of the top surface of the substrate or the surface above the top surface of the substrate. In some embodiments, the material layer covers 50% to 99% of the top surface of the substrate or the surface above the top surface of the substrate. In some embodiments, the material layer covers 60% to 100% of the top surface of the substrate or the surface above the top surface of the substrate. In some embodiments, the material layer covers 70% to 100% of the top surface of the substrate or the surface above the top surface of the substrate. In some embodiments, the material layer covers 80% to 100% of the top surface of the substrate or the surface above the top surface of the substrate. In some embodiments, the material layer covers 85% to 100% of the top surface of the substrate or the surface above the top surface of the substrate. In some embodiments, the material layer covers 90% to 100% of the top surface of the substrate or the surface above the top surface of the substrate. In some embodiments, the material layer covers 90% to 95% of the top surface of the substrate or the surface above the top surface of the substrate. In some embodiments, the material layer covers 85% to 95% of the top surface of the substrate or the surface above the top surface of the substrate. In some embodiments, the material layer covers 80% to 90% of the top surface of the substrate or the surface above the top surface of the substrate. In some embodiments, the material layer covers 75% to 90% of the top surface of the substrate or the surface above the top surface of the substrate. In some embodiments, the material layer covers 75% to 85% of the top surface of the substrate or the surface above the top surface of the substrate. In some embodiments, the material layer covers 70% to 90% of the top surface of the substrate or the surface above the top surface of the substrate. In some embodiments, the material layer covers 70% to 85% of the top surface of the substrate or the surface above the top surface of the substrate. In some embodiments, the material layer covers 70% to 80% of the top surface of the substrate or the surface above the top surface of the substrate. In some embodiments, the material layer covers 60% to 90% of the top surface of the substrate or the surface above the top surface of the substrate. In some embodiments, the material layer covers 60% to 85% of the top surface of the substrate or the surface above the top surface of the substrate. In some embodiments, the material layer covers 60% to 80% of the top surface of the substrate or the surface above the top surface of the substrate. In some embodiments, the material layer covers 60% to 75% of the top surface of the substrate or the surface above the top surface of the substrate. In some embodiments, the material layer covers 50% to 90% of the top surface of the substrate or the surface above the top surface of the substrate. In some embodiments, the material layer covers 50% to 85% of the top surface of the substrate or the surface above the top surface of the substrate. In some embodiments, the material layer covers 50% to 80% of the top surface of the substrate or the surface above the top surface of the substrate. In some embodiments, the material layer covers 50% to 70% of the top surface of the substrate or the surface above the top surface of the substrate.

In some embodiments, the material layer covers at least a portion of the top surface of the asphalt filled coating. In some embodiments, the material layer covers at least 50% of the top surface of the asphalt filled coating. In some embodiments, the material layer covers at least 55% of the top surface of the asphalt filled coating. In some embodiments, the material layer covers at least 60% of the top surface of the asphalt filled coating. In some embodiments, the material layer covers at least 65% of the top surface of the asphalt filled coating. In some embodiments, the material layer covers at least 70% of the top surface of the asphalt filled coating. In some embodiments, the material layer covers at least 75% of the top surface of the asphalt filled coating. In some embodiments, the material layer covers at least 80% of the top surface of the asphalt filled coating. In some embodiments, the material layer covers at least 85% of the top surface of the asphalt filled coating. In some embodiments, the material layer covers at least 90% of the top surface of the asphalt filled coating. In some embodiments, the material layer covers at least 95% of the top surface of the asphalt filled coating.

In some embodiments, the material layer covers 50% to 100% of the top surface of the asphalt filled coating. In some embodiments, the material layer covers 50% to 99% of the top surface of the asphalt filled coating. In some embodiments, the material layer covers 60% to 100% of the top surface of the asphalt filled coating. In some embodiments, the material layer covers 70% to 100% of the top surface of the asphalt filled coating. In some embodiments, the material layer covers 80% to 100% of the top surface of the asphalt filled coating. In some embodiments, the material layer covers 85% to 100% of the top surface of the asphalt filled coating. In some embodiments, the material layer covers 90% to 100% of the top surface of the asphalt filled coating. In some embodiments, the material layer covers 90% to 95% of the top surface of the asphalt filled coating. In some embodiments, the material layer covers 85% to 95% of the top surface of the asphalt filled coating. In some embodiments, the material layer covers 80% to 90% of the top surface of the asphalt filled coating. In some embodiments, the material layer covers 75% to 90% of the top surface of the asphalt filled coating. In some embodiments, the material layer covers 75% to 85% of the top surface of the asphalt filled coating. In some embodiments, the material layer covers 70% to 90% of the top surface of the asphalt filled coating. In some embodiments, the material layer covers 70% to 85% of the top surface of the asphalt filled coating. In some embodiments, the material layer covers 70% to 80% of the top surface of the asphalt filled coating. In some embodiments, the material layer covers 60% to 90% of the top surface of the asphalt filled coating. In some embodiments, the material layer covers 60% to 85% of the top surface of the asphalt filled coating. In some embodiments, the material layer covers 60% to 80% of the top surface of the asphalt filled coating. In some embodiments, the material layer covers 60% to 75% of the top surface of the asphalt filled coating. In some embodiments, the material layer covers 50% to 90% of the top surface of the asphalt filled coating. In some embodiments, the material layer covers 50% to 85% of the top surface of the asphalt filled coating. In some embodiments, the material layer covers 50% to 80% of the top surface of the asphalt filled coating. In some embodiments, the material layer covers 50% to 70% of the top surface of the asphalt filled coating.

In some embodiments, a thickness of the material layer is 1 mil to 500 mils. In some embodiments, the thickness of the material layer is 1 mil to 450 mils. In some embodiments, the thickness of the material layer is 1 mil to 400 mils. In some embodiments, the thickness of the material layer is 1 mil to 350 mils. In some embodiments, the thickness of the material layer is 1 mil to 300 mils. In some embodiments, the thickness of the material layer is 1 mil to 250 mils. In some embodiments, the thickness of the material layer is 1 mil to 200 mils. In some embodiments, the thickness of the material layer is 1 mil to 190 mils. In some embodiments, the thickness of the material layer is 1 mil to 180 mils. In some embodiments, the thickness of the material layer is 1 mil to 170 mils. In some embodiments, the thickness of the material layer is 1 mil to 160 mils. In some embodiments, the thickness of the material layer is 1 mil to 150 mils. In some embodiments, the thickness of the material layer is 1 mil to 140 mils. In some embodiments, the thickness of the material layer is 1 mil to 130 mils. In some embodiments, the thickness of the material layer is 1 mil to 120 mils. In some embodiments, the thickness of the material layer is 1 mil to 110 mils. In some embodiments, the thickness of the material layer is 1 mil to 100 mils. In some embodiments, the thickness of the material layer is 1 mil to 90 mils. In some embodiments, the thickness of the material layer is 1 mil to 80 mils. In some embodiments, the thickness of the material layer is 1 mil to 70 mils. In some embodiments, the thickness of the material layer is 1 mil to 60 mils. In some embodiments, the thickness of the material layer is 1 mil to 50 mils. In some embodiments, the thickness of the material layer is 1 mil to 45 mils. In some embodiments, the thickness of the material layer is 1 mil to 40 mils. In some embodiments, the thickness of the material layer is 1 mil to 35 mils. In some embodiments, the thickness of the material layer is 1 mil to 30 mils. In some embodiments, the thickness of the material layer is 1 mil to 25 mils. In some embodiments, the thickness of the material layer is 1 mil to 20 mils. In some embodiments, the thickness of the material layer is 1 mil to 15 mils. In some embodiments, the thickness of the material layer is 1 mil to 10 mils. In some embodiments, the thickness of the material layer is 1 mil to 5 mils.

In some embodiments, the thickness of the material layer is 5 mils to 500 mils. In some embodiments, the thickness of the material layer is 10 mils to 500 mils. In some embodiments, the thickness of the material layer is 15 mils to 500 mils. In some embodiments, the thickness of the material layer is 20 mils to 500 mils. In some embodiments, the thickness of the material layer is 25 mils to 500 mils. In some embodiments, the thickness of the material layer is 30 mils to 500 mils. In some embodiments, the thickness of the material layer is 35 mils to 500 mils. In some embodiments, the thickness of the material layer is 40 mils to 500 mils. In some embodiments, the thickness of the material layer is 45 mils to 500 mils. In some embodiments, the thickness of the material layer is 50 mils to 500 mils. In some embodiments, the thickness of the material layer is 60 mils to 500 mils. In some embodiments, the thickness of the material layer is 70 mils to 500 mils. In some embodiments, the thickness of the material layer is 80 mils to 500 mils. In some embodiments, the thickness of the material layer is 90 mils to 500 mils. In some embodiments, the thickness of the material layer is 100 mils to 500 mils. In some embodiments, the thickness of the material layer is 150 mils to 500 mils. In some embodiments, the thickness of the material layer is 200 mils to 500 mils. In some embodiments, the thickness of the material layer is 250 mils to 500 mils. In some embodiments, the thickness of the material layer is 300 mils to 500 mils. In some embodiments, the thickness of the material layer is 350 mils to 500 mils. In some embodiments, the thickness of the material layer is 400 mils to 500 mils. In some embodiments, the thickness of the material layer is 450 mils to 500 mils.

In some embodiments, the material layer has a viscosity of 8000 centipoise (cP) or less. In some embodiments, the material layer has a viscosity of 6000 cP or less. In some embodiments, the material layer has a viscosity of 5000 cP or less. In some embodiments, the material layer has a viscosity of 4000 cP or less. In some embodiments, the material layer has a viscosity of 3000 cP or less. In some embodiments, the material layer has a viscosity of 2000 cP or less. In some embodiments, the material layer has a viscosity of 1000 cP or less. In some embodiments, the material layer has a viscosity of 500 cP or less. In some embodiments, the material layer has a viscosity of 500 cP to 8000 cP. In some embodiments, the material layer has a viscosity of 500 cP to 7000 cP. In some embodiments, the material layer has a viscosity of 500 cP to 6000 cP. In some embodiments, the material layer has a viscosity of 500 cP to 5000 cP. In some embodiments, the material layer has a viscosity of 500 cP to 4000 cP. In some embodiments, the material layer has a viscosity of 500 cP to 3000 cP. In some embodiments, the material layer has a viscosity of 500 cP to 2000 cP. In some embodiments, the material layer has a viscosity of 750 cP to 8000 cP. In some embodiments, the material layer has a viscosity of 1000 cP to 8000 cP. In some embodiments, the material layer has a viscosity of 1500 cP to 8000 cP. In some embodiments, the material layer has a viscosity of 2000 cP to 8000 cP. In some embodiments, the material layer has a viscosity of 3000 cP to 8000 cP. In some embodiments, the material layer has a viscosity of 4000 cP to 8000 cP. In some embodiments, the material layer has a viscosity of 5000 cP to 8000 cP. In some embodiments, the material layer has a viscosity of 6000 cP to 8000 cP. In some embodiments, the material layer has a viscosity of 7000 cP to 8000 cP. In some embodiments, the viscosity of the material layer is measured according to ASTM D2196 using a RV3 viscometer spindle at 50 rpm and 23° C.

In some embodiments, the material layer is graphene. For example, in some embodiments, the material layer is a plurality of graphene particles. In some embodiments, the material layer comprises a plurality of graphene particles. In some embodiments, the plurality of graphene particles is applied on a surface of the coating layer (e.g., on a surface of an asphalt filled coating). In some embodiments, the plurality of graphene particles is directly applied on a surface of the coating layer (e.g., on a surface of an asphalt filled coating).

In some embodiments, a thickness of the coating layer is 1 mil to 500 mils. In some embodiments, the thickness of the coating layer is 1 mil to 450 mils. In some embodiments, the thickness of the coating layer is 1 mil to 400 mils. In some embodiments, the thickness of the coating layer is 1 mil to 350 mils. In some embodiments, the thickness of the coating layer is 1 mil to 300 mils. In some embodiments, the thickness of the coating layer is 1 mil to 250 mils. In some embodiments, the thickness of the coating layer is 1 mil to 200 mils. In some embodiments, the thickness of the coating layer is 1 mil to 190 mils. In some embodiments, the thickness of the coating layer is 1 mil to 180 mils. In some embodiments, the thickness of the coating layer is 1 mil to 170 mils. In some embodiments, the thickness of the coating layer is 1 mil to 160 mils. In some embodiments, the thickness of the coating layer is 1 mil to 150 mils. In some embodiments, the thickness of the coating layer is 1 mil to 140 mils. In some embodiments, the thickness of the coating layer is 1 mil to 130 mils. In some embodiments, the thickness of the coating layer is 1 mil to 120 mils. In some embodiments, the thickness of the coating layer is 1 mil to 110 mils. In some embodiments, the thickness of the coating layer is 1 mil to 100 mils. In some embodiments, the thickness of the coating layer is 1 mil to 90 mils. In some embodiments, the thickness of the coating layer is 1 mil to 80 mils. In some embodiments, the thickness of the coating layer is 1 mil to 70 mils. In some embodiments, the thickness of the coating layer is 1 mil to 60 mils. In some embodiments, the thickness of the coating layer is 1 mil to 50 mils. In some embodiments, the thickness of the coating layer is 1 mil to 45 mils. In some embodiments, the thickness of the coating layer is 1 mil to 40 mils. In some embodiments, the thickness of the coating layer is 1 mil to 35 mils. In some embodiments, the thickness of the coating layer is 1 mil to 30 mils. In some embodiments, the thickness of the coating layer is 1 mil to 25 mils. In some embodiments, the thickness of the coating layer is 1 mil to 20 mils. In some embodiments, the thickness of the coating layer is 1 mil to 15 mils. In some embodiments, the thickness of the coating layer is 1 mil to 10 mils. In some embodiments, the thickness of the coating layer is 1 mil to 5 mils.

In some embodiments, the thickness of the coating layer is 5 mils to 500 mils. In some embodiments, the thickness of the coating layer is 10 mils to 500 mils. In some embodiments, the thickness of the coating layer is 15 mils to 500 mils. In some embodiments, the thickness of the coating layer is 20 mils to 500 mils. In some embodiments, the thickness of the coating layer is 25 mils to 500 mils. In some embodiments, the thickness of the coating layer is 30 mils to 500 mils. In some embodiments, the thickness of the coating layer is 35 mils to 500 mils. In some embodiments, the thickness of the coating layer is 40 mils to 500 mils. In some embodiments, the thickness of the coating layer is 45 mils to 500 mils. In some embodiments, the thickness of the coating layer is 50 mils to 500 mils. In some embodiments, the thickness of the coating layer is 60 mils to 500 mils. In some embodiments, the thickness of the coating layer is 70 mils to 500 mils. In some embodiments, the thickness of the coating layer is 80 mils to 500 mils. In some embodiments, the thickness of the coating layer is 90 mils to 500 mils. In some embodiments, the thickness of the coating layer is 100 mils to 500 mils. In some embodiments, the thickness of the coating layer is 150 mils to 500 mils. In some embodiments, the thickness of the coating layer is 200 mils to 500 mils. In some embodiments, the thickness of the coating layer is 250 mils to 500 mils. In some embodiments, the thickness of the coating layer is 300 mils to 500 mils. In some embodiments, the thickness of the coating layer is 350 mils to 500 mils. In some embodiments, the thickness of the coating layer is 400 mils to 500 mils. In some embodiments, the thickness of the coating layer is 450 mils to 500 mils.

In some embodiments, the at least one additive comprises at least one of at least one dispersing agent, at least one adhesion promoter, at least one colorant, at least one viscosity modifier, at least one filler, at least one opacifier, at least one UV absorber, at least one cross-linking agent, at least one particle spacer, or any combination thereof.

In some embodiments, the at least one dispersing agent comprises at least one of isopropyl alcohol, sodium dodecylbenzenesulfonate, sodium dodecylsulfonate, polyvinylpyrrolidone, sodium cholate, polystyrene, polyvinyl alcohol, or any combination thereof. The at least one dispersing agent is present in an amount of 0.1% to 10% by weight based on the total weight of at least one of the at least one additive, the substrate, the material layer, the coating layer, or any combination thereof.

In some embodiments, the at least one adhesion promoter comprises at least one of tackifiers, styrene-butadiene-styrene copolymer (SBS) modifiers, atactic polypropylene (APP) modifiers, asphalt emulsions, ethylene vinyl acetate (EVA) copolymers, fatty acids, polyamines, tall oils, paraffin waxes, or any combination thereof. The at least one adhesion promoter is present in an amount of 0.01% to 5% by weight based on the total weight of at least one of the at least one additive, the substrate, the material layer, the coating layer, or any combination thereof.

In some embodiments, the at least one colorant includes at least one of a mixed metal oxide pigment, a pearlescent pigment, a metal-coated flake, a metal oxide coated plate-like pigment, a mica, a metallic flake, an infrared-reflective pigment, a metallic powder, or any combination thereof. The at least one colorant is present in an amount of 0.5% to 50% by weight based on the total weight of at least one of the at least one additive, the substrate, the material layer, the coating layer, or any combination thereof.

In some embodiments, the at least one viscosity modifier comprises at least one of hydroxyl ethyl cellulose (HEC), polyacrylamide (PAA), rheology modifiers, cellulosics, acrylics, associated thickeners, clays, organoclays, hydrogenated caster oils, polyamides, overbased sulphonates, or any combination thereof. The at least one viscosity modifier is present in an amount of 0.01% to 5% by weight based on the total weight of at least one of the at least one additive, the substrate, the material layer, the coating layer, or any combination thereof.

In some embodiments, the at least one filler comprises at least one of calcium carbonate, barium sulfate, calcium sulfate, talc, limestone, perlite, silica, fumed silica, precipitated silica, quartz, aluminum trihydrate, magnesium hydroxide, magnesium dihydroxide, colemanite, titanium dioxide, snow white, fly ash, carbon black, recycled rubber tires, recycled shingles, recycled thermoplastic resins, basalt, roofing granules, clay, ammonium polyphosphate, graphite, or any combination thereof. In some embodiments, the at least one filler comprises a fire retardant. In some embodiments, the at least one filler is present in an amount of 1% to 100% by weight based on the total weight of at least one of the substrate, the material layer, the coating layer, or any combination thereof. In some embodiments, the at least one filler is present in an amount of 10% to 90% by weight based on the total weight of at least one of the substrate, the material layer, the coating layer, or any combination thereof. In some embodiments, the at least one filler is present in an amount of up to 80% by weight based on the total weight of at least one of the substrate, the material layer, the coating layer, or any combination thereof. In some embodiments, the at least one filler is present in an amount of up to 70% by weight based on the total weight of at least one of the substrate, the material layer, the coating layer, or any combination thereof. In some embodiments, the at least one filler is present in an amount of 10% to 70% by weight based on the total weight of at least one of the substrate, the material layer, the coating layer, or any combination thereof. In some embodiments, the at least one filler is present in an amount of 20% to 70% by weight based on the total weight of at least one of the substrate, the material layer, the coating layer, or any combination thereof. In some embodiments, the at least one filler is present in an amount of 30% to 70% by weight based on the total weight of at least one of the substrate, the material layer, the coating layer, or any combination thereof. In some embodiments, the at least one filler is present in an amount of 40% to 70% by weight based on the total weight of at least one of the substrate, the material layer, the coating layer, or any combination thereof. In some embodiments, the at least one filler is present in an amount of 50% to 70% by weight based on the total weight of at least one of the substrate, the material layer, the coating layer, or any combination thereof.

In some embodiments, the at least one filler is present in an amount of 10% to 60% by weight based on the total weight of at least one of the substrate, the material layer, the coating layer, or any combination thereof. In some embodiments, the at least one filler is present in an amount of 10% to 50% by weight based on the total weight of at least one of the substrate, the material layer, the coating layer, or any combination thereof. In some embodiments, the at least one filler is present in an amount of 10% to 40% by weight based on the total weight of at least one of the substrate, the material layer, the coating layer, or any combination thereof. In some embodiments, the at least one filler is present in an amount of 10% to 30% by weight based on the total weight of at least one of the substrate, the material layer, the coating layer, or any combination thereof. In some embodiments, the at least one filler is present in an amount of 10% to 20% by weight based on the total weight of at least one of the substrate, the material layer, the coating layer, or any combination thereof.

In some embodiments, the at least one opacifier includes at least one of air bubbles, hollowed spheres, plastic particles, light scattering particles, metallic particles, a titanium dioxide, an aluminum oxide, an alumina, a kaolin, ceramic particles, calcined clay particles, a zinc oxide, a barium sulfate, or any combination thereof. The at least one opacifier is present in an amount of 0.1% to 10% by weight based on the total weight of at least one of the at least one additive, the substrate, the material layer, the coating layer, or any combination thereof.

In some embodiments, the at least one UV absorber comprises at least one of hindered amines, anti-oxidants, benzotriazoles, benzophenones, organic nickel compounds, cyanoacrylates, nanoparticles, zinc oxides, anatase, rutiles, or any combination thereof. In some embodiments, the at least one UV absorber is present in an amount of 0.05% to 8% by weight based on the total weight of at least one of the substrate, the material layer, the coating layer, or any combination thereof.

In some embodiments, the at least one cross-linking agent comprises at least one of n-butyl polytitanate (BTP), phthalates, titanium chelates, titanium acetylacetonates, or any combination thereof. In some embodiments, the at least one cross-linking agent is present in an amount of 0.01% to 5% by weight based on the total weight of at least one of the substrate, the material layer, the coating layer, or any combination thereof.

In some embodiments, the at least one particle spacer comprises at least one of clays, kaolins, nanoparticles, ceramic spheres, or any combination thereof. In some embodiments, the at least one particle spacer is present in an amount of 0.1% to 10% by weight based on the total weight of at least one of the substrate, the material layer, the coating layer, or any combination thereof.

In some embodiments, the at least one additive is present in an amount of 80% to 99.9% by weight based on a total weight of at least one of the substrate, the material layer, the coating layer, or any combination thereof. In some embodiments, the at least one additive is present in an amount of 85% to 99.9% by weight based on the total weight of at least one of the substrate, the material layer, the coating layer, or any combination thereof. In some embodiments, the at least one additive is present in an amount of 90% to 99.9% by weight based on the total weight of at least one of the substrate, the material layer, the coating layer, or any combination thereof. In some embodiments, the at least one additive is present in an amount of 91% to 99.9% by weight based on the total weight of at least one of the substrate, the material layer, the coating layer, or any combination thereof. In some embodiments, the at least one additive is present in an amount of 92% to 99.9% by weight based on the total weight of at least one of the substrate, the material layer, the coating layer, or any combination thereof. In some embodiments, the at least one additive is present in an amount of 93% to 99.9% by weight based on the total weight of at least one of the substrate, the material layer, the coating layer, or any combination thereof. In some embodiments, the at least one additive is present in an amount of 94% to 99.9% by weight based on the total weight of at least one of the substrate, the material layer, the coating layer, or any combination thereof. In some embodiments, the at least one additive is present in an amount of 95% to 99.9% by weight based on the total weight of at least one of the substrate, the material layer, the coating layer, or any combination thereof. In some embodiments, the at least one additive is present in an amount of 96% to 99.9% by weight based on the total weight of at least one of the substrate, the material layer, the coating layer, or any combination thereof. In some embodiments, the at least one additive is present in an amount of 97% to 99.9% by weight based on the total weight of at least one of the substrate, the material layer, the coating layer, or any combination thereof. In some embodiments, the at least one additive is present in an amount of 98% to 99.9% by weight based on the total weight of at least one of the substrate, the material layer, the coating layer, or any combination thereof. In some embodiments, the at least one additive is present in an amount of 98.1% to 99.9% by weight based on the total weight of at least one of the substrate, the material layer, the coating layer, or any combination thereof. In some embodiments, the at least one additive is present in an amount of 98.2% to 99.9% by weight based on the total weight of at least one of the substrate, the material layer, the coating layer, or any combination thereof. In some embodiments, the at least one additive is present in an amount of 98.3% to 99.9% by weight based on the total weight of at least one of the substrate, the material layer, the coating layer, or any combination thereof. In some embodiments, the at least one additive is present in an amount of 98.4% to 99.9% by weight based on the total weight of at least one of the substrate, the material layer, the coating layer, or any combination thereof. In some embodiments, the at least one additive is present in an amount of 98.5% to 99.9% by weight based on the total weight of at least one of the substrate, the material layer, the coating layer, or any combination thereof. In some embodiments, the at least one additive is present in an amount of 98.6% to 99.9% by weight based on the total weight of at least one of the substrate, the material layer, the coating layer, or any combination thereof. In some embodiments, the at least one additive is present in an amount of 98.7% to 99.9% by weight based on the total weight of at least one of the substrate, the material layer, the coating layer, or any combination thereof. In some embodiments, the at least one additive is present in an amount of 98.8% to 99.9% by weight based on the total weight of at least one of the substrate, the material layer, the coating layer, or any combination thereof. In some embodiments, the at least one additive is present in an amount of 98.9% to 99.9% by weight based on the total weight of at least one of the substrate, the material layer, the coating layer, or any combination thereof. In some embodiments, the at least one additive is present in an amount of 99% to 99.9% by weight based on the total weight of at least one of the substrate, the material layer, the coating layer, or any combination thereof. In some embodiments, the at least one additive is present in an amount of 99.1% to 99.9% by weight based on the total weight of at least one of the substrate, the material layer, the coating layer, or any combination thereof. In some embodiments, the at least one additive is present in an amount of 99.2% to 99.9% by weight based on the total weight of at least one of the substrate, the material layer, the coating layer, or any combination thereof. In some embodiments, the at least one additive is present in an amount of 99.3% to 99.9% by weight based on the total weight of at least one of the substrate, the material layer, the coating layer, or any combination thereof. In some embodiments, the at least one additive is present in an amount of 99.4% to 99.9% by weight based on the total weight of at least one of the substrate, the material layer, the coating layer, or any combination thereof. In some embodiments, the at least one additive is present in an amount of 99.5% to 99.9% by weight based on the total weight of at least one of the substrate, the material layer, the coating layer, or any combination thereof.

In some embodiments, the coating layer is an asphalt filled coating. In some embodiments, the asphalt filled coating comprises asphalt and at least one filler. In some embodiments, the asphalt filled coating does not comprise graphene. In some embodiments, the asphalt filled coating does not comprise graphite.

In some embodiments, the asphalt filled coating comprises 10% to 90% by weight of the asphalt based on a total weight of the asphalt filled coating. In some embodiments, the asphalt filled coating comprises 10% to 85% by weight of the asphalt based on a total weight of the asphalt filled coating. In some embodiments, the asphalt filled coating comprises 10% to 80% by weight of the asphalt based on a total weight of the asphalt filled coating. In some embodiments, the asphalt filled coating comprises 10% to 75% by weight of the asphalt based on a total weight of the asphalt filled coating. In some embodiments, the asphalt filled coating comprises 10% to 70% by weight of the asphalt based on a total weight of the asphalt filled coating. In some embodiments, the asphalt filled coating comprises 10% to 65% by weight of the asphalt based on a total weight of the asphalt filled coating. In some embodiments, the asphalt filled coating comprises 10% to 60% by weight of the asphalt based on a total weight of the asphalt filled coating. In some embodiments, the asphalt filled coating comprises 10% to 55% by weight of the asphalt based on a total weight of the asphalt filled coating. In some embodiments, the asphalt filled coating comprises 10% to 50% by weight of the asphalt based on a total weight of the asphalt filled coating. In some embodiments, the asphalt filled coating comprises 10% to 45% by weight of the asphalt based on a total weight of the asphalt filled coating. In some embodiments, the asphalt filled coating comprises 10% to 40% by weight of the asphalt based on a total weight of the asphalt filled coating. In some embodiments, the asphalt filled coating comprises 10% to 35% by weight of the asphalt based on a total weight of the asphalt filled coating. In some embodiments, the asphalt filled coating comprises 10% to 30% by weight of the asphalt based on a total weight of the asphalt filled coating. In some embodiments, the asphalt filled coating comprises 10% to 25% by weight of the asphalt based on a total weight of the asphalt filled coating. In some embodiments, the asphalt filled coating comprises 10% to 20% by weight of the asphalt based on a total weight of the asphalt filled coating. In some embodiments, the asphalt filled coating comprises 10% to 15% by weight of the asphalt based on a total weight of the asphalt filled coating.

In some embodiments, the asphalt filled coating comprises 15% to 90% by weight of the asphalt based on a total weight of the asphalt filled coating. In some embodiments, the asphalt filled coating comprises 20% to 90% by weight of the asphalt based on a total weight of the asphalt filled coating. In some embodiments, the asphalt filled coating comprises 25% to 90% by weight of the asphalt based on a total weight of the asphalt filled coating. In some embodiments, the asphalt filled coating comprises 30% to 90% by weight of the asphalt based on a total weight of the asphalt filled coating. In some embodiments, the asphalt filled coating comprises 35% to 90% by weight of the asphalt based on a total weight of the asphalt filled coating. In some embodiments, the asphalt filled coating comprises 40% to 90% by weight of the asphalt based on a total weight of the asphalt filled coating. In some embodiments, the asphalt filled coating comprises 45% to 90% by weight of the asphalt based on a total weight of the asphalt filled coating. In some embodiments, the asphalt filled coating comprises 50% to 90% by weight of the asphalt based on a total weight of the asphalt filled coating. In some embodiments, the asphalt filled coating comprises 55% to 90% by weight of the asphalt based on a total weight of the asphalt filled coating. In some embodiments, the asphalt filled coating comprises 60% to 90% by weight of the asphalt based on a total weight of the asphalt filled coating. In some embodiments, the asphalt filled coating comprises 65% to 90% by weight of the asphalt based on a total weight of the asphalt filled coating. In some embodiments, the asphalt filled coating comprises 70% to 90% by weight of the asphalt based on a total weight of the asphalt filled coating. In some embodiments, the asphalt filled coating comprises 75% to 90% by weight of the asphalt based on a total weight of the asphalt filled coating. In some embodiments, the asphalt filled coating comprises 80% to 90% by weight of the asphalt based on a total weight of the asphalt filled coating. In some embodiments, the asphalt filled coating comprises 85% to 90% by weight of the asphalt based on a total weight of the asphalt filled coating.

In some embodiments, the asphalt filled coating comprises 10% to 90% by weight of the at least one filler based on the total weight of the asphalt filled coating. In some embodiments, the asphalt filled coating comprises 10% to 85% by weight of the at least one filler based on the total weight of the asphalt filled coating. In some embodiments, the asphalt filled coating comprises 10% to 80% by weight of the at least one filler based on the total weight of the asphalt filled coating. In some embodiments, the asphalt filled coating comprises 10% to 75% by weight of the at least one filler based on the total weight of the asphalt filled coating. In some embodiments, the asphalt filled coating comprises 10% to 70% by weight of the at least one filler based on the total weight of the asphalt filled coating. In some embodiments, the asphalt filled coating comprises 10% to 65% by weight of the at least one filler based on the total weight of the asphalt filled coating. In some embodiments, the asphalt filled coating comprises 10% to 60% by weight of the at least one filler based on the total weight of the asphalt filled coating. In some embodiments, the asphalt filled coating comprises 10% to 55% by weight of the at least one filler based on the total weight of the asphalt filled coating. In some embodiments, the asphalt filled coating comprises 10% to 50% by weight of the at least one filler based on the total weight of the asphalt filled coating. In some embodiments, the asphalt filled coating comprises 10% to 45% by weight of the at least one filler based on the total weight of the asphalt filled coating. In some embodiments, the asphalt filled coating comprises 10% to 40% by weight of the at least one filler based on the total weight of the asphalt filled coating. In some embodiments, the asphalt filled coating comprises 10% to 35% by weight of the at least one filler based on the total weight of the asphalt filled coating. In some embodiments, the asphalt filled coating comprises 10% to 30% by weight of the at least one filler based on the total weight of the asphalt filled coating. In some embodiments, the asphalt filled coating comprises 10% to 25% by weight of the at least one filler based on the total weight of the asphalt filled coating. In some embodiments, the asphalt filled coating comprises 10% to 20% by weight of the at least one filler based on the total weight of the asphalt filled coating. In some embodiments, the asphalt filled coating comprises 10% to 15% by weight of the at least one filler based on the total weight of the asphalt filled coating.

In some embodiments, the asphalt filled coating comprises 15% to 90% by weight of the at least one filler based on the total weight of the asphalt filled coating. In some embodiments, the asphalt filled coating comprises 20% to 90% by weight of the at least one filler based on the total weight of the asphalt filled coating. In some embodiments, the asphalt filled coating comprises 25% to 90% by weight of the at least one filler based on the total weight of the asphalt filled coating. In some embodiments, the asphalt filled coating comprises 30% to 90% by weight of the at least one filler based on the total weight of the asphalt filled coating. In some embodiments, the asphalt filled coating comprises 35% to 90% by weight of the at least one filler based on the total weight of the asphalt filled coating. In some embodiments, the asphalt filled coating comprises 40% to 90% by weight of the at least one filler based on the total weight of the asphalt filled coating. In some embodiments, the asphalt filled coating comprises 45% to 90% by weight of the at least one filler based on the total weight of the asphalt filled coating. In some embodiments, the asphalt filled coating comprises 50% to 90% by weight of the at least one filler based on the total weight of the asphalt filled coating. In some embodiments, the asphalt filled coating comprises 55% to 90% by weight of the at least one filler based on the total weight of the asphalt filled coating. In some embodiments, the asphalt filled coating comprises 60% to 90% by weight of the at least one filler based on the total weight of the asphalt filled coating. In some embodiments, the asphalt filled coating comprises 65% to 90% by weight of the at least one filler based on the total weight of the asphalt filled coating. In some embodiments, the asphalt filled coating comprises 70% to 90% by weight of the at least one filler based on the total weight of the asphalt filled coating. In some embodiments, the asphalt filled coating comprises 75% to 90% by weight of the at least one filler based on the total weight of the asphalt filled coating. In some embodiments, the asphalt filled coating comprises 80% to 90% by weight of the at least one filler based on the total weight of the asphalt filled coating. In some embodiments, the asphalt filled coating comprises 85% to 90% by weight of the at least one filler based on the total weight of the asphalt filled coating.

In some embodiments, the graphene improves at least one property of the roofing shingle. For example, in some embodiments, the graphene improves a total solar reflectance (TSR) of the roofing shingle. In some embodiments, the graphene reduces solar heat absorption of the roofing shingle. In some embodiments, the graphene improves an ultraviolet (UV) resistance of the roofing shingle. In some embodiments, the graphene is an oxygen barrier layer that improves long-term aging of the roofing shingle by reducing oxygen diffusion into an asphalt-containing layer and, by that, reducing the rate of oxidation of asphalt. In some embodiments, an asphalt filled coating comprising graphene is an oxygen barrier layer. In some embodiments, graphene applied to the surface of the asphalt filled coating is an oxygen barrier layer. In some embodiments, the graphene improves an aesthetic appearance of the roofing shingle by providing a metallic appearance, reducing a staining potential of asphalt-containing layers, or any combination thereof. In some embodiments, the presence of the graphene in the roofing shingle obviates the need for the roofing shingle to comprise roofing granules. In some embodiments, the presence of the graphene in the roofing shingle reduces biofilm growth, algae growth, or any combination thereof. In some embodiments, the presence of the graphene in the roofing shingle enhances fire resistance of the roofing shingle. In some embodiments, the presence of graphene in the roofing shingle imparts electrical conductivity to the roofing shingle. For example, in some embodiments, the presence of graphene in the roofing shingle confers additional functionality, such as, for example and without limitation, at least one of leaking detection, LED lighting, sensing for weather conditions, sensing for impact, or any combination thereof.

In some embodiments, the roofing shingle having a total solar reflectance greater than a total solar reflectance of a roofing shingle control. In some embodiments, the roofing shingle control is a roofing shingle without the plurality of graphene particles. In some embodiments, the roofing shingle control is the same as the roofing shingle, except the roofing shingle control does not comprise graphene (e.g., graphene particles). In some embodiments, the total solar reflectance of the roofing shingle is at least 2% greater than the total solar reflectance of the roofing shingle control. In some embodiments, the total solar reflectance of the roofing shingle is at least 3% greater than the total solar reflectance of the roofing shingle control. In some embodiments, the total solar reflectance of the roofing shingle is at least 4% greater than the total solar reflectance of the roofing shingle control. In some embodiments, the total solar reflectance of the roofing shingle is at least 5% greater than the total solar reflectance of the roofing shingle control. In some embodiments, the total solar reflectance of the roofing shingle is at least 10% greater than the total solar reflectance of the roofing shingle control. In some embodiments, the total solar reflectance of the roofing shingle is at least 15% greater than the total solar reflectance of the roofing shingle control. In some embodiments, the total solar reflectance of the roofing shingle is at least 20% greater than the total solar reflectance of the roofing shingle control. In some embodiments, the total solar reflectance of the roofing shingle is at least 25% greater than the total solar reflectance of the roofing shingle control. In some embodiments, the total solar reflectance of the roofing shingle is at least 30% greater than the total solar reflectance of the roofing shingle control. In some embodiments, the total solar reflectance is measured according to ASTM C1549.

In some embodiments, the total solar reflectance of the roofing shingle is 2% to 30% greater than the total solar reflectance of the roofing shingle control. In some embodiments, the total solar reflectance of the roofing shingle is 3% to 30% greater than the total solar reflectance of the roofing shingle control. In some embodiments, the total solar reflectance of the roofing shingle is 4% to 30% greater than the total solar reflectance of the roofing shingle control. In some embodiments, the total solar reflectance of the roofing shingle is 4.5% to 30% greater than the total solar reflectance of the roofing shingle control. In some embodiments, the total solar reflectance of the roofing shingle is 5% to 30% greater than the total solar reflectance of the roofing shingle control. In some embodiments, the total solar reflectance of the roofing shingle is 5.5% to 30% greater than the total solar reflectance of the roofing shingle control. In some embodiments, the total solar reflectance of the roofing shingle is 6% to 30% greater than the total solar reflectance of the roofing shingle control. In some embodiments, the total solar reflectance of the roofing shingle is 7% to 30% greater than the total solar reflectance of the roofing shingle control. In some embodiments, the total solar reflectance of the roofing shingle is 8% to 30% greater than the total solar reflectance of the roofing shingle control. In some embodiments, the total solar reflectance of the roofing shingle is 9% to 30% greater than the total solar reflectance of the roofing shingle control. In some embodiments, the total solar reflectance of the roofing shingle is 10% to 30% greater than the total solar reflectance of the roofing shingle control. In some embodiments, the total solar reflectance of the roofing shingle is 12.5% to 30% greater than the total solar reflectance of the roofing shingle control. In some embodiments, the total solar reflectance of the roofing shingle is 15% to 30% greater than the total solar reflectance of the roofing shingle control. In some embodiments, the total solar reflectance of the roofing shingle is 17.5% to 30% greater than the total solar reflectance of the roofing shingle control. In some embodiments, the total solar reflectance of the roofing shingle is 19% to 30% greater than the total solar reflectance of the roofing shingle control. In some embodiments, the total solar reflectance of the roofing shingle is 19.5% to 30% greater than the total solar reflectance of the roofing shingle control. In some embodiments, the total solar reflectance of the roofing shingle is 20% to 30% greater than the total solar reflectance of the roofing shingle control. In some embodiments, the total solar reflectance of the roofing shingle is 20.5% to 30% greater than the total solar reflectance of the roofing shingle control. In some embodiments, the total solar reflectance of the roofing shingle is 21% to 30% greater than the total solar reflectance of the roofing shingle control. In some embodiments, the total solar reflectance of the roofing shingle is 22.5% to 30% greater than the total solar reflectance of the roofing shingle control. In some embodiments, the total solar reflectance of the roofing shingle is 25% to 30% greater than the total solar reflectance of the roofing shingle control. In some embodiments, the total solar reflectance of the roofing shingle is 27.5% to 30% greater than the total solar reflectance of the roofing shingle control. In some embodiments, the total solar reflectance of the roofing shingle is 15% to 25% greater than the total solar reflectance of the roofing shingle control. In some embodiments, the total solar reflectance of the roofing shingle is 15.5% to 21.5% greater than the total solar reflectance of the roofing shingle control. In some embodiments, the total solar reflectance of the roofing shingle is 18% to 20.5% greater than the total solar reflectance of the roofing shingle control. In some embodiments, the total solar reflectance of the roofing shingle is 16.5% to 19% greater than the total solar reflectance of the roofing shingle control. In some embodiments, the total solar reflectance is measured according to ASTM C1549.

In some embodiments, the total solar reflectance of the roofing shingle is 2% to 25% greater than the total solar reflectance of the roofing shingle control. In some embodiments, the total solar reflectance of the roofing shingle is 2% to 24% greater than the total solar reflectance of the roofing shingle control. In some embodiments, the total solar reflectance of the roofing shingle is 2% to 23% greater than the total solar reflectance of the roofing shingle control. In some embodiments, the total solar reflectance of the roofing shingle is 2% to 22.5% greater than the total solar reflectance of the roofing shingle control. In some embodiments, the total solar reflectance of the roofing shingle is 2% to 22% greater than the total solar reflectance of the roofing shingle control. In some embodiments, the total solar reflectance of the roofing shingle is 2% to 21.5% greater than the total solar reflectance of the roofing shingle control. In some embodiments, the total solar reflectance of the roofing shingle is 2% to 20% greater than the total solar reflectance of the roofing shingle control. In some embodiments, the total solar reflectance of the roofing shingle is 2% to 19.5% greater than the total solar reflectance of the roofing shingle control. In some embodiments, the total solar reflectance of the roofing shingle is 2% to 19% greater than the total solar reflectance of the roofing shingle control. In some embodiments, the total solar reflectance of the roofing shingle is 2% to 18.5% greater than the total solar reflectance of the roofing shingle control. In some embodiments, the total solar reflectance of the roofing shingle is 2% to 18% greater than the total solar reflectance of the roofing shingle control. In some embodiments, the total solar reflectance of the roofing shingle is 2% to 17.5% greater than the total solar reflectance of the roofing shingle control. In some embodiments, the total solar reflectance of the roofing shingle is 2% to 15% greater than the total solar reflectance of the roofing shingle control. In some embodiments, the total solar reflectance of the roofing shingle is 2% to 12.5% greater than the total solar reflectance of the roofing shingle control. In some embodiments, the total solar reflectance of the roofing shingle is 2% to 10% greater than the total solar reflectance of the roofing shingle control. In some embodiments, the total solar reflectance of the roofing shingle is 2% to 9% greater than the total solar reflectance of the roofing shingle control. In some embodiments, the total solar reflectance of the roofing shingle is 2% to 8% greater than the total solar reflectance of the roofing shingle control. In some embodiments, the total solar reflectance of the roofing shingle is 2% to 7% greater than the total solar reflectance of the roofing shingle control. In some embodiments, the total solar reflectance is measured according to ASTM C1549.

In some embodiments, a plurality of control roofing shingles is or comprises the roofing shingle control.

In some embodiments, the high total solar reflectance of the roofing shingle obviates the need for roofing granules, reduces the coverage of roofing granules, permits use of less UV-opaque granules, or any combination thereof. For example, in some embodiments, the roofing shingle does not comprise roofing granules. In some embodiments, the roofing shingle comprises roofing granules. In some embodiments, at least one of the substrate, the material layer, the coating layer, or any combination thereof does not comprise roofing granules. In some embodiments, at least one of the substrate, the material layer, the coating layer, or any combination thereof comprises roofing granules.

In some embodiments, a CIELAB color value of the roofing shingle comprises an L* value of 50 or less. In some embodiments, the CIELAB color value of the roofing shingle comprises an L* value of 45 or less. In some embodiments, the CIELAB color value of the roofing shingle comprises an L* value of 40 or less. In some embodiments, the CIELAB color value of the roofing shingle comprises an L* value of 35 or less. In some embodiments, the CIELAB color value of the roofing shingle comprises an L* value of 30 or less. In some embodiments, the CIELAB color value of the roofing shingle comprises an L* value of 25 or less. In some embodiments, the CIELAB color value of the roofing shingle comprises an L* value of 20 or less. In some embodiments, the CIELAB color value of the roofing shingle comprises an L* value of 15 or less. In some embodiments, the CIELAB color value of the roofing shingle comprises an L* value of 10 or less. In some embodiments, the CIELAB color value of the roofing shingle comprises an L* value of 9 or less. In some embodiments, the CIELAB color value of the roofing shingle comprises an L* value of 8 or less.

In some embodiments, the CIELAB color value of the roofing shingle comprises an L* value range of 0<L*<50. In some embodiments, the CIELAB color value of the roofing shingle comprises an L* value range of 0<L*<45. In some embodiments, the CIELAB color value of the roofing shingle comprises an L* value range of 0<L*<40. In some embodiments, the CIELAB color value of the roofing shingle comprises an L* value range of 0<L*<35. In some embodiments, the CIELAB color value of the roofing shingle comprises an L* value range of 0<L*<30. In some embodiments, the CIELAB color value of the roofing shingle comprises an L* value range of 0<L*<25. In some embodiments, the CIELAB color value of the roofing shingle comprises an L* value range of 0<L*<20. In some embodiments, the CIELAB color value of the roofing shingle comprises an L* value range of 0<L*<15. In some embodiments, the CIELAB color value of the roofing shingle comprises an L* value range of 0<L*<10. In some embodiments, the CIELAB color value of the roofing shingle comprises an L* value range of 0<L*<9. In some embodiments, the CIELAB color value of the roofing shingle comprises an L* value range of 0<L*<8.

In some embodiments, the CIELAB color value of the roofing shingle comprises an L* value range of 1<L*<50. In some embodiments, the CIELAB color value of the roofing shingle comprises an L* value range of 1<L*<45. In some embodiments, the CIELAB color value of the roofing shingle comprises an L* value range of 1<L*<40. In some embodiments, the CIELAB color value of the roofing shingle comprises an L* value range of 5<L*<40. In some embodiments, the CIELAB color value of the roofing shingle comprises an L* value range of 10<L*<45. In some embodiments, the CIELAB color value of the roofing shingle comprises an L* value range of 10<L*<40. In some embodiments, the CIELAB color value of the roofing shingle comprises an L* value range of 15<L*<40. In some embodiments, the CIELAB color value of the roofing shingle comprises an L* value range of 20<L*<40. In some embodiments, the CIELAB color value of the roofing shingle comprises an L* value range of 25<L*<40. In some embodiments, the CIELAB color value of the roofing shingle comprises an L* value range of 25<L*<45. In some embodiments, the CIELAB color value of the roofing shingle comprises an L* value range of 30<L*<45. In some embodiments, the CIELAB color value of the roofing shingle comprises an L* value range of 30<L*<40.

In some embodiments, the electrical conductivity of the roofing shingle is greater than an electrical conductivity of a roofing shingle control. In some embodiments, the roofing shingle control is the same as the roofing shingle, except the roofing shingle control does not comprise graphene. In some embodiments, the roofing shingle having an electrical conductivity of 10 kΩ to 100 kΩ. In some embodiments, the roofing shingle having an electrical conductivity of 10 kΩ to 90 kΩ. In some embodiments, the roofing shingle having an electrical conductivity of 10 kΩ to 80 kΩ. In some embodiments, the roofing shingle having an electrical conductivity of 10 kΩ to 70 kΩ. In some embodiments, the roofing shingle having an electrical conductivity of 10 kΩ to 60 kΩ. In some embodiments, the roofing shingle having an electrical conductivity of 10 kΩ to 50 kΩ. In some embodiments, the roofing shingle having an electrical conductivity of 10 kΩ to 40 kΩ. In some embodiments, the roofing shingle having an electrical conductivity of 10 kΩ to 30 kΩ. In some embodiments, the roofing shingle having an electrical conductivity of 20 kΩ to 100 kΩ. In some embodiments, the roofing shingle having an electrical conductivity of 30 kΩ to 100 kΩ. In some embodiments, the roofing shingle having an electrical conductivity of 40 kΩ to 100 kΩ. In some embodiments, the roofing shingle having an electrical conductivity of 50 kΩ to 100 kΩ. In some embodiments, the roofing shingle having an electrical conductivity of 60 kΩ to 100 kΩ. In some embodiments, the roofing shingle having an electrical conductivity of 70 kΩ to 100 kΩ. In some embodiments, the roofing shingle having an electrical conductivity of 80 kΩ to 100 kΩ. In some embodiments, the roofing shingle having an electrical conductivity of 20 kΩ to 80 kΩ. In some embodiments, the roofing shingle having an electrical conductivity of 30 kΩ to 70 kΩ. In some embodiments, the roofing shingle having an electrical conductivity of 40 kΩ to 60 kΩ. In some embodiments, the conductivity is measured using a digital multimeter (e.g., Model 87V from Fluke).

A non-limiting example of a roofing shingle 100 according to some embodiments of the present disclosure is shown in FIG. 1. As shown in FIG. 1, in some embodiments, the roofing shingle 100 comprises, consists of, or consists essentially of a substrate 102, a material layer 104, or any combination thereof. In some embodiments, the material layer 104 is disposed on or above the substrate 102.

Figure 2:
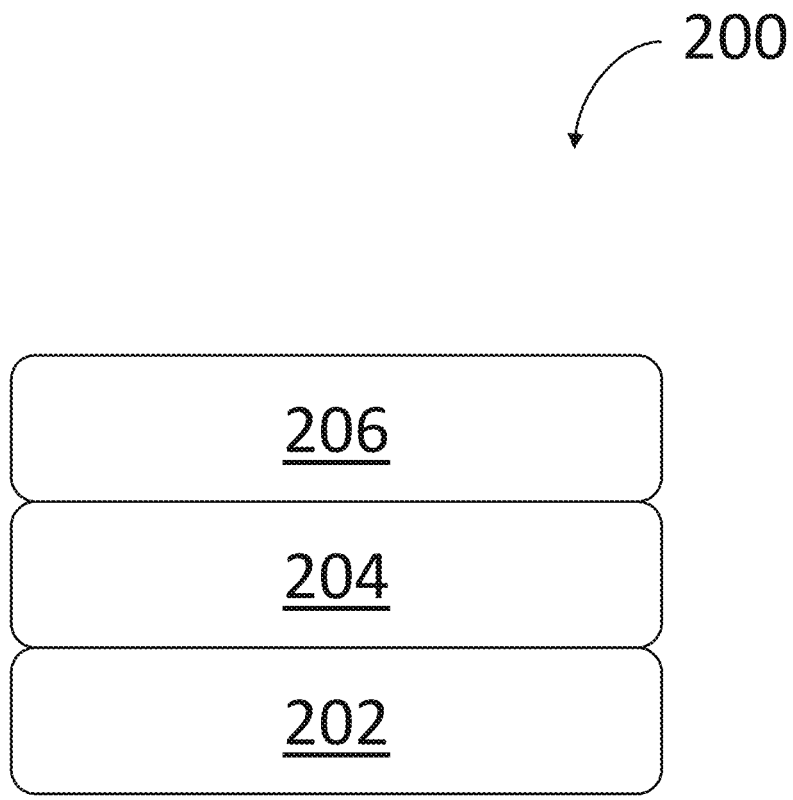
FIG. 2 is a schematic diagram of a roofing shingle, according to some embodiments of the present disclosure.

Another non-limiting example of a roofing shingle 200 according to some embodiments of the present disclosure is shown in FIG. 2. As shown in FIG. 2, the roofing shingle 200 comprises, consists of, or consists essentially of a substrate 202, a coating layer 204, a material layer 206, or any combination thereof. In some embodiments, the coating layer 204 is disposed on or above the substrate 202. In some embodiments, the material layer 206 is disposed on or above the substrate 202. In some embodiments, the material layer 206 is disposed on or above the coating layer 204. In some embodiments, the coating layer 204 is disposed between the substrate 202 and the material layer 206.

Figure 3:
FIG. 3 is a schematic diagram of a roofing shingle, according to some embodiments of the present disclosure.

Another further non-limiting example of a roofing shingle 300 according to some embodiments of the present disclosure is shown in FIG. 3. As shown in FIG. 3, the roofing shingle 300 comprises, consists of, or consists essentially of a layer 302. In some embodiments, the layer 302 is a substrate. In some embodiments, the layer 302 comprises, consists of, or consists essentially of a material layer or a coating layer.

Some embodiments of the present disclosure relate to a roofing system. In some embodiments, the roofing system comprises a roofing substrate. In some embodiments, the roofing substrate comprises at least one of a roof deck, an underlayment, or any combination thereof. In some embodiments, the roofing system comprises a plurality of roofing shingles. In some embodiments, the plurality of roofing shingles on the roofing substrate. In some embodiments, the plurality of roofing shingles is secured to the roofing substrate. In some embodiments, the plurality of roofing shingles is fastened to the roofing substrate. In some embodiments, each roofing shingle of the plurality of roofing shingles comprises a substrate, an asphalt filled coating on the substrate, and a plurality of graphene particles covering at least a portion of the asphalt filled coating.

Some embodiments of the present disclosure provide a method. In some embodiments, the method relates to the preparation of building materials comprising graphene, including, for example and without limitation, roofing shingles comprising graphene.

Figure 4:
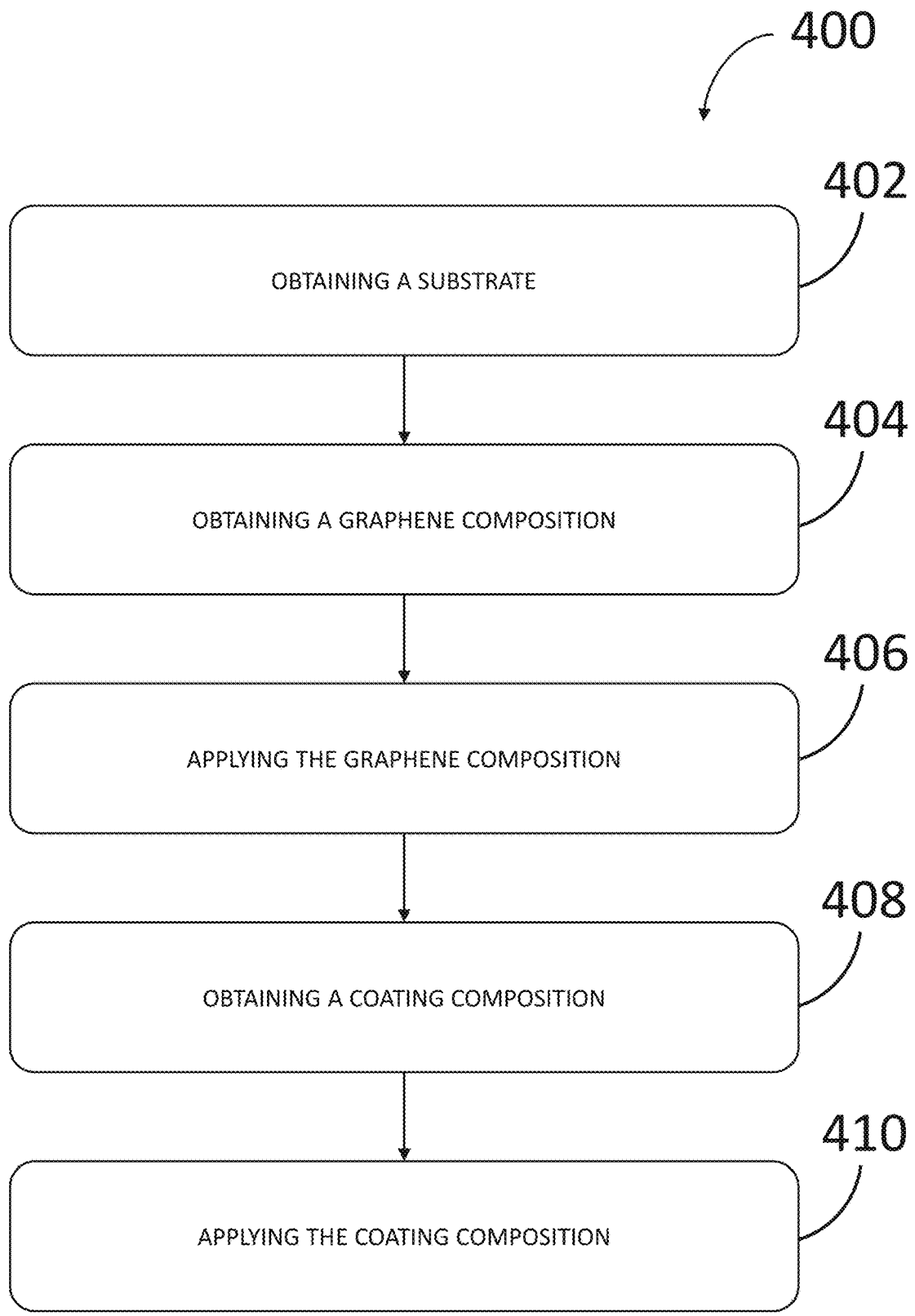
FIG. 4 is a flowchart of a method, according to some embodiments of the present disclosure.
Figures 5A, 5B, 5C, 5D:
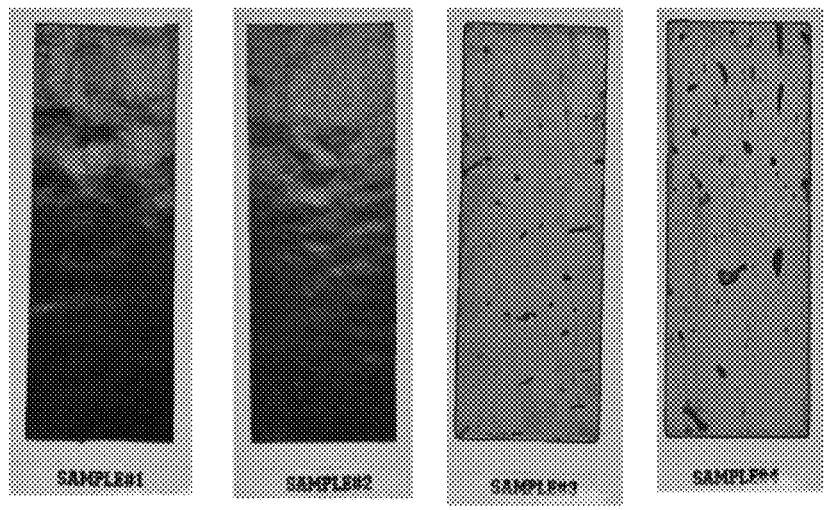
FIGS. 5A-5D are photographs of (A) sample 1, (B) sample 2, (C) sample 3, and (D) sample 4, according to some embodiments of the present disclosure.

A non-limiting example of a method 400 of preparing a roofing shingle according to some embodiments of the present disclosure is shown in FIG. 4. As shown in FIG. 4, in some embodiments, the method 400 comprises one or more of the following steps, any one of which may be performed in any order: at step 402, obtaining a substrate; at step 404, obtaining a graphene composition; and, at step 406, applying the graphene composition. In some embodiments, the method 400 further comprises one or more of the following steps, any one of which may be performed in any order with respect to steps 402 to 410: at step 408, obtaining a coating composition; and at step 410, applying the coating composition.

At step 402, the method comprises obtaining a substrate. In some embodiments, the substrate having a top surface and a bottom surface. In some embodiments, the obtaining the substrate comprises heating an asphalt until a molten asphalt is obtained, mixing at least one additive with the molten asphalt, cooling the molten asphalt to a room temperature, or any combination thereof.

At step 404, the method comprises obtaining a graphene composition. In some embodiments, the graphene composition comprises a plurality of graphene particles. In some embodiments, the graphene composition comprises, consists of, or consists essentially of at least graphene. In some embodiments, the graphene composition comprises, consists of, or consists essentially of graphene, asphalt, a liquid media, at least one additive, or any combination thereof. In some embodiments, the graphene composition comprises, consists of, or consists essentially of graphene, asphalt, molten asphalt, at least one additive, or any combination thereof. In some embodiments, the graphene composition comprises graphene and a liquid media comprising at least one additive, wherein the at least one additive comprises at least isopropyl alcohol. In some embodiments, the obtaining the graphene composition comprises mixing the graphene with at least one of a liquid media, asphalt, molten asphalt, at least one additive, or any combination thereof. In some embodiments, the obtaining the graphene composition comprises dispersing the graphene in at least one of a liquid media, at least one additive, or any combination thereof. In some embodiments, the mixing or the dispersing proceeds under agitation, a low shear mixer, a high shear mixer, or any combination thereof. In some embodiments, the amount of the graphene mixed or dispersed with at least one of a liquid media, asphalt, molten asphalt, at least one additive, or any combination thereof is sufficient to form a material layer or a coating layer with the surface coverage of graphene described herein. In some embodiments, the material layer or coating layer with the surface coverage of graphene described herein is obtained by applying the graphene and removing (e.g., by evaporation) the liquid media or curing (e.g., by heating or increasing temperature) the at least one additive. In some embodiments, the liquid media comprises water. In some embodiments, the liquid media comprises cooling water.

At step 406, the method comprises applying the graphene composition to the top surface of the substrate or a surface above the top surface of the substrate. In some embodiments, the applying the graphene composition comprises at least one of the following methods: a brushing on application, a roll transfer application, a fabric roll application, an air brush application, or any combination thereof. In some embodiments, the applying the graphene composition comprises at least one of spraying, roll coating, brushing, vapor deposition, dipping (e.g., immersing), curtain coater, or any combination thereof. In some embodiments, the graphene composition comprises at least graphene and at least one of asphalt or molten asphalt, wherein the applying the graphene composition comprises an electrostatic deposition application, wherein the electrostatic deposition application comprises applying an electric field proximate to the graphene composition to cause the graphene to migrate to a surface of the graphene composition. In some embodiments, after applying the electric field and upon cooling the graphene composition, a material layer or a coating layer is formed on the substrate. In some embodiments, the applying the graphene composition comprises removing the liquid media from the graphene composition to obtain a material layer. In some embodiments, the liquid media is removed by evaporation. In some embodiments, the applying the graphene composition comprises curing the graphene composition to obtain a material layer. In some embodiments, the method comprises applying the graphene composition onto the asphalt filled coating such that the plurality of graphene particles covers at least a portion of the asphalt filled coating.

In some embodiments, the graphene composition is applied to the top surface of the substrate or a surface above the top surface of the substrate while the top surface of the substrate or the surface above the top surface of the substrate is at a room temperature. In some embodiments, the graphene composition is applied to the top surface of the substrate or a surface above the top surface of the substrate while the top surface of the substrate or the surface above the top surface of the substrate is at a temperature greater than a room temperature. For example, in some embodiments, the method further comprises heating the substrate to a first temperature from a room temperature, wherein the first temperature is greater than the room temperature. In some embodiments, the substrate is heated to the first temperature from the room temperature, prior to the applying the graphene composition. In some embodiments, the method comprises cooling the substrate to a room temperature prior to heating the substrate to the first temperature from the room temperature, prior to applying the graphene composition, or any combination thereof. In some embodiments, the method further comprises heating the coating layer (e.g., asphalt filled coating) to a first temperature from a room temperature, wherein the first temperature is greater than the room temperature. In some embodiments, the coating layer is heated to the first temperature from the room temperature, prior to the applying the graphene composition. In some embodiments, the method comprises cooling the asphalt filled coating to a room temperature prior to heating the asphalt filled coating to the first temperature from the room temperature, prior to applying the graphene composition, or any combination thereof.

In some embodiments, the first temperature is greater than a room temperature. In some embodiments, the first temperature is 80° F. to 390° F. In some embodiments, the first temperature is 90° F. to 390° F. In some embodiments, the first temperature is 100° F. to 390° F. In some embodiments, the first temperature is 105° F. to 390° F. In some embodiments, the first temperature is 110° F. to 390° F. In some embodiments, the first temperature is 115° F. to 390° F. In some embodiments, the first temperature is 120° F. to 390° F. In some embodiments, the first temperature is 125° F. to 390° F. In some embodiments, the first temperature is 130° F. to 390° F. In some embodiments, the first temperature is 140° F. to 390° F. In some embodiments, the first temperature is 150° F. to 390° F. In some embodiments, the first temperature is 200° F. to 390° F. In some embodiments, the first temperature is 250° F. to 390° F. In some embodiments, the first temperature is 300° F. to 390° F. In some embodiments, the first temperature is 350° F. to 390° F. In some embodiments, the first temperature is 80° F. to 350° F. In some embodiments, the first temperature is 90° F. to 350° F. In some embodiments, the first temperature is 100° F. to 350° F. In some embodiments, the first temperature is 100° F. to 300° F. In some embodiments, the first temperature is 100° F. to 250° F. In some embodiments, the first temperature is 100° F. to 200° F. In some embodiments, the first temperature is 100° F. to 150° F. In some embodiments, the first temperature is 70° F. to 150° F. In some embodiments, the first temperature is 80° F. to 150° F. In some embodiments, the first temperature is 90° F. to 150° F. In some embodiments, the first temperature is 70° F. to 120° F. In some embodiments, the first temperature is 100° F. to 160° F. In some embodiments, the first temperature is 110° F. to 150° F. In some embodiments, the first temperature is 110° F. to 140° F. In some embodiments, the first temperature is 120° F. to 150° F. In some embodiments, the first temperature is 120° F. to 140° F. In some embodiments, the first temperature is 125° F. to 135° F. In some embodiments, the first temperature is a temperature at which asphalt becomes molten.

In some embodiments, the graphene is present in an amount of 0.0001% to 20% by weight based on a total weight of the graphene composition. In some embodiments, the graphene is present in an amount of 0.1% to 19% by weight based on the total weight of the graphene composition. In some embodiments, the graphene is present in an amount of 0.1% to 18% by weight based on the total weight of the graphene composition. In some embodiments, the graphene is present in an amount of 0.1% to 17% by weight based on the total weight of the graphene composition. In some embodiments, the graphene is present in an amount of 0.1% to 16% by weight based on the total weight of the graphene composition. In some embodiments, the graphene is present in an amount of 0.1% to 15% by weight based on the total weight of the graphene composition. In some embodiments, the graphene is present in an amount of 0.1% to 14% by weight based on the total weight of the graphene composition. In some embodiments, the graphene is present in an amount of 0.1% to 13% by weight based on the total weight of the graphene composition. In some embodiments, the graphene is present in an amount of 0.1% to 12% by weight based on the total weight of the graphene composition. In some embodiments, the graphene is present in an amount of 0.1% to 11% by weight based on the total weight of the graphene composition. In some embodiments, the graphene is present in an amount of 0.1% to 10% by weight based on the total weight of the graphene composition. In some embodiments, the graphene is present in an amount of 0.1% to 9% by weight based on the total weight of the graphene composition. In some embodiments, the graphene is present in an amount of 0.1% to 8% by weight based on the total weight of the graphene composition. In some embodiments, the graphene is present in an amount of 0.1% to 7% by weight based on the total weight of the graphene composition. In some embodiments, the graphene is present in an amount of 0.1% to 6% by weight based on the total weight of the graphene composition. In some embodiments, the graphene is present in an amount of 0.1% to 5% by weight based on the total weight of the graphene composition. In some embodiments, the graphene is present in an amount of 0.1% to 4% by weight based on the total weight of the graphene composition. In some embodiments, the graphene is present in an amount of 0.1% to 3% by weight based on the total weight of the graphene composition. In some embodiments, the graphene is present in an amount of 0.1% to 2% by weight based on the total weight of the graphene composition. In some embodiments, the graphene is present in an amount of 0.1% to 1.9% by weight based on the total weight of the graphene composition. In some embodiments, the graphene is present in an amount of 0.1% to 1.8% by weight based on the total weight of the graphene composition. In some embodiments, the graphene is present in an amount of 0.1% to 1.7% by weight based on the total weight of the graphene composition. In some embodiments, the graphene is present in an amount of 0.1% to 1.6% by weight based on the total weight of the graphene composition. In some embodiments, the graphene is present in an amount of 0.1% to 1.5% by weight based on the total weight of the graphene composition. In some embodiments, the graphene is present in an amount of 0.1% to 1.4% by weight based on the total weight of the graphene composition. In some embodiments, the graphene is present in an amount of 0.1% to 1.3% by weight based on the total weight of the graphene composition. In some embodiments, the graphene is present in an amount of 0.1% to 1.2% by weight based on the total weight of the graphene composition. In some embodiments, the graphene is present in an amount of 0.1% to 1.1% by weight based on the total weight of the graphene composition. In some embodiments, the graphene is present in an amount of 0.1% to 1% by weight based on the total weight of the graphene composition. In some embodiments, the graphene is present in an amount of 0.1% to 0.9% by weight based on the total weight of the graphene composition. In some embodiments, the graphene is present in an amount of 0.1% to 0.8% by weight based on the total weight of the graphene composition. In some embodiments, the graphene is present in an amount of 0.1% to 0.7% by weight based on the total weight of the graphene composition. In some embodiments, the graphene is present in an amount of 0.1% to 0.6% by weight based on the total weight of the graphene composition. In some embodiments, the graphene is present in an amount of 0.1% to 0.5% by weight based on the total weight of the graphene composition. In some embodiments, the graphene is present in an amount of 0.1% to 0.4% by weight based on the total weight of the graphene composition. In some embodiments, the graphene is present in an amount of 0.1% to 0.3% by weight based on the total weight of the graphene composition. In some embodiments, the graphene is present in an amount of 0.1% to 0.2% by weight based on the total weight of the graphene composition.

In some embodiments, the graphene is present in an amount of 0.1% to 5% by weight based on a total weight of the graphene composition. In some embodiments, the graphene is present in an amount of 0.2% to 5% by weight based on the total weight of the graphene composition. In some embodiments, the graphene is present in an amount of 0.3% to 5% by weight based on the total weight of the graphene composition. In some embodiments, the graphene is present in an amount of 0.4% to 5% by weight based on the total weight of the graphene composition. In some embodiments, the graphene is present in an amount of 0.5% to 5% by weight based on the total weight of the graphene composition. In some embodiments, the graphene is present in an amount of 0.6% to 5% by weight based on the total weight of the graphene composition. In some embodiments, the graphene is present in an amount of 0.7% to 5% by weight based on the total weight of the graphene composition. In some embodiments, the graphene is present in an amount of 0.8% to 5% by weight based on the total weight of the graphene composition. In some embodiments, the graphene is present in an amount of 0.9% to 5% by weight based on the total weight of the graphene composition. In some embodiments, the graphene is present in an amount of 1% to 5% by weight based on the total weight of the graphene composition. In some embodiments, the graphene is present in an amount of 1.1% to 5% by weight based on the total weight of the graphene composition. In some embodiments, the graphene is present in an amount of 1.2% to 5% by weight based on the total weight of the graphene composition. In some embodiments, the graphene is present in an amount of 1.3% to 5% by weight based on the total weight of the graphene composition. In some embodiments, the graphene is present in an amount of 1.4% to 5% by weight based on the total weight of the graphene composition. In some embodiments, the graphene is present in an amount of 1.5% to 5% by weight based on the total weight of the graphene composition. In some embodiments, the graphene is present in an amount of 1.6% to 5% by weight based on the total weight of the graphene composition. In some embodiments, the graphene is present in an amount of 1.7% to 5% by weight based on the total weight of the graphene composition. In some embodiments, the graphene is present in an amount of 1.8% to 5% by weight based on the total weight of the graphene composition. In some embodiments, the graphene is present in an amount of 1.9% to 5% by weight based on the total weight of the graphene composition. In some embodiments, the graphene is present in an amount of 2% to 5% by weight based on the total weight of the graphene composition. In some embodiments, the graphene is present in an amount of 2.1% to 5% by weight based on the total weight of the graphene composition. In some embodiments, the graphene is present in an amount of 2.2% to 5% by weight based on the total weight of the graphene composition. In some embodiments, the graphene is present in an amount of 2.3% to 5% by weight based on the total weight of the graphene composition. In some embodiments, the graphene is present in an amount of 2.4% to 5% by weight based on the total weight of the graphene composition. In some embodiments, the graphene is present in an amount of 2.5% to 5% by weight based on the total weight of the graphene composition. In some embodiments, the graphene is present in an amount of 2.6% to 5% by weight based on the total weight of the graphene composition. In some embodiments, the graphene is present in an amount of 2.7% to 5% by weight based on the total weight of the graphene composition. In some embodiments, the graphene is present in an amount of 2.8% to 5% by weight based on the total weight of the graphene composition. In some embodiments, the graphene is present in an amount of 2.9% to 5% by weight based on the total weight of the graphene composition. In some embodiments, the graphene is present in an amount of 3.0% to 5% by weight based on the total weight of the graphene composition. In some embodiments, the graphene is present in an amount of 3.1% to 5% by weight based on the total weight of the graphene composition. In some embodiments, the graphene is present in an amount of 3.2% to 5% by weight based on the total weight of the graphene composition. In some embodiments, the graphene is present in an amount of 3.3% to 5% by weight based on the total weight of the graphene composition. In some embodiments, the graphene is present in an amount of 3.4% to 5% by weight based on the total weight of the graphene composition. In some embodiments, the graphene is present in an amount of 3.5% to 5% by weight based on the total weight of the graphene composition. In some embodiments, the graphene is present in an amount of 3.6% to 5% by weight based on the total weight of the graphene composition. In some embodiments, the graphene is present in an amount of 3.7% to 5% by weight based on the total weight of the graphene composition. In some embodiments, the graphene is present in an amount of 3.8% to 5% by weight based on the total weight of the graphene composition. In some embodiments, the graphene is present in an amount of 3.9% to 5% by weight based on the total weight of the graphene composition. In some embodiments, the graphene is present in an amount of 4.0% to 5% by weight based on the total weight of the graphene composition. In some embodiments, the graphene is present in an amount of 4.1% to 5% by weight based on the total weight of the graphene composition. In some embodiments, the graphene is present in an amount of 4.2% to 5% by weight based on the total weight of the graphene composition. In some embodiments, the graphene is present in an amount of 4.3% to 5% by weight based on the total weight of the graphene composition. In some embodiments, the graphene is present in an amount of 4.4% to 5% by weight based on the total weight of the graphene composition. In some embodiments, the graphene is present in an amount of 4.5% to 5% by weight based on the total weight of the graphene composition. In some embodiments, the graphene is present in an amount of 4.6% to 5% by weight based on the total weight of the graphene composition. In some embodiments, the graphene is present in an amount of 4.7% to 5% by weight based on the total weight of the graphene composition. In some embodiments, the graphene is present in an amount of 4.8% to 5% by weight based on the total weight of the graphene composition. In some embodiments, the graphene is present in an amount of 4.9% to 5% by weight based on the total weight of the graphene composition.

In some embodiments, the graphene is present in an amount of 0.1% to 2% by weight based on a total weight of the graphene composition. In some embodiments, the graphene is present in an amount of 0.2% to 2% by weight based on the total weight of the graphene composition. In some embodiments, the graphene is present in an amount of 0.3% to 2% by weight based on the total weight of the graphene composition. In some embodiments, the graphene is present in an amount of 0.4% to 2% by weight based on the total weight of the graphene composition. In some embodiments, the graphene is present in an amount of 0.5% to 2% by weight based on the total weight of the graphene composition. In some embodiments, the graphene is present in an amount of 0.6% to 2% by weight based on the total weight of the graphene composition. In some embodiments, the graphene is present in an amount of 0.7% to 2% by weight based on the total weight of the graphene composition. In some embodiments, the graphene is present in an amount of 0.8% to 2% by weight based on the total weight of the graphene composition. In some embodiments, the graphene is present in an amount of 0.9% to 2% by weight based on the total weight of the graphene composition. In some embodiments, the graphene is present in an amount of 1% to 2% by weight based on the total weight of the graphene composition. In some embodiments, the graphene is present in an amount of 1.1% to 2% by weight based on the total weight of the graphene composition. In some embodiments, the graphene is present in an amount of 1.2% to 2% by weight based on the total weight of the graphene composition. In some embodiments, the graphene is present in an amount of 1.3% to 2% by weight based on the total weight of the graphene composition. In some embodiments, the graphene is present in an amount of 1.4% to 2% by weight based on the total weight of the graphene composition. In some embodiments, the graphene is present in an amount of 1.5% to 2% by weight based on the total weight of the graphene composition. In some embodiments, the graphene is present in an amount of 1.6% to 2% by weight based on the total weight of the graphene composition. In some embodiments, the graphene is present in an amount of 1.7% to 2% by weight based on the total weight of the graphene composition. In some embodiments, the graphene is present in an amount of 1.8% to 2% by weight based on the total weight of the graphene composition. In some embodiments, the graphene is present in an amount of 1.9% to 2% by weight based on the total weight of the graphene composition.

In some embodiments, at least one of asphalt, at least one additive, or any combination thereof comprises a balance of the graphene composition, wherein the graphene composition comprises at least graphene.

At step 408, the method comprises obtaining a coating composition. For example, in some embodiments, the method comprises obtaining an asphalt filled coating composition. In some embodiments, the asphalt filled coating composition comprises an asphalt and at least one filler.

At step 410, the method comprises applying the coating composition. In some embodiments, the coating composition is applied to the top surface of the substrate. In some embodiments, applying the coating composition forms a coating layer, wherein the coating layer having a top surface and a bottom surface. In some embodiments, the surface above the top surface of the substrate is the top surface of the coating layer. In some embodiments, the coating composition and the coating layer comprise, consist of, or consist essentially of at least molten asphalt, asphalt, at least one additive, or any combination thereof. In some embodiments, the method comprises applying the asphalt filled coating composition onto the substrate to form an asphalt filled coating on the substrate.

In some embodiments, a method comprises one or more of the following steps: obtaining a substrate; obtaining an asphalt filled coating composition; obtaining a graphene composition; applying the asphalt filled coating composition onto the substrate to form an asphalt filled coating on the substrate; and applying the graphene composition onto the asphalt filled coating such that the plurality of graphene particles covers at least a portion of the asphalt filled coating. In some embodiments, the graphene composition comprises a liquid media and the plurality of graphene particles are dispersed in the liquid media. In some embodiments, the applying the graphene composition comprises an electrostatic deposition of the plurality of graphene particles on the substrate. In some embodiments, the applying the graphene composition comprises at least one of a brushing on application, a roll transfer application, a fabric roll application, or an air brush application.

EXAMPLES

Example 1

Sample of asphaltic substrate was prepared by heating 0.35 lbs. of roofing-grade asphalt (available from Countrymark Refining and Logistics, LLC, Mt. Vernon, IN) to 390° F. until a molten, liquid state was obtained. 0.65 lb of limestone fillers (available from H&G Limestone Products, Elizabethtown, IL) were then introduced into the molten asphalt under agitation and heated until a uniform mixture was obtained. The resultant coating was then poured onto a wax paper and formed into a layer of 50 mils thickness via a roller mill. The resultant asphaltic substrate was then allowed to cool to room temperature. The resultant asphaltic substrate exhibited a total solar reflectance of 5% as measured by the method described in ASTM C1549. The sample surface had a CIE Lab color of $L^*=1.8$, $a^*=0.2$, and $b^*=0.3$. The data is listed in Table 1.

Example 2

The asphaltic substrate as in Example 1 was prepared in the same manner, except that 4% by weight of graphene, or 0.04 lb of graphene powder (GrapheneBlack Powder 3×, available from NanoXplore Inc., Saint-Laurent, QC, Canada), and 61% of the same limestone fillers were added into molten asphalt during the mixing stage. The coating was then processed in the same manner as Example 1 to produce an asphaltic substrate having a thickness of 50 mils. The resultant substrate has a total solar reflectance of 7% and a color ($L^*=7.7$, $a^*=2.5$, $b^*=4.9$) similar to the sample from Example 1. This example demonstrated that adding graphene directly into the molten asphalt showed only marginal improvement to the solar reflectance of the asphaltic substrate. Again, the data is shown in Table 1.

Example 3

The same asphaltic substrate as in Example 1 was prepared in the same manner to form the layer with a thickness of 50 mils. Graphene powder as in Example 2 was then brushed on to the surface of the asphaltic substrate at a room temperature using a Bristle brush, and the weight was measured before and after application of the graphene powder to calculate the amount of graphene added to the surface. The resultant surface had a uniform metallic appearance and a total solar reflectance of 22% as measured by the same ASTM C1549 method. The resultant surface had a desirable aesthetic appearance, with the color reading of $L^*=32.4$, $a^*=0.3$, and $b^*=0.3$. The total amount applied was only at 0.02 wt % and the resultant surface showed a drastic increase in solar reflectivity. The data is shown in Table 2 for reference.

Example 4

The same sample as in Example 3 was prepared except that the application of graphene was performed by first heating the asphaltic substrate to 130° F. in a forced-air oven, followed by the brush-on application of the graphene powder. The resultant surface had a higher total solar reflectance at 24% and a slightly higher application rate at 0.06 wt %. The data is also shown in Table 2 and the surfaces of the samples 1 to 4 are shown in FIGS. 5A-5D, respectively. Again, the surface had an appealing metallic color and a desirable dark color useful for application as roof coverings.

TABLE 1

| Example # | Asphalt Coating Formulation, wt % | | Graphene Amount, wt % | Total Solar Reflectance | CIE Lab Color Reading | | |
|---|---|---|---|---|---|---|---|
| | Asphalt | Fillers | | | L* | a* | b* |
| 1 | 35% | 65% | 0% | 0.05 | 1.8 | 0.2 | 0.3 |
| 2 | 35% | 61% | 4% | 0.07 | 7.7 | 2.5 | 4.9 |

TABLE 2

| Example # | Graphene Application Temp. (° F.) | Avg. Graphene Application Rate wt % | Avg. Graphene Application Rate Gm/100 ft² | Avg. Total Solar Reflectance, % before | Avg. Total Solar Reflectance, % after | CIE Lab Color Reading L* | CIE Lab Color Reading a* | CIE Lab Color Reading b* |
|---|---|---|---|---|---|---|---|---|
| 3 | 70 | 0.02 | 7.2 | 5% | 22% | 32.4 | 0.3 | 0.3 |
| 4 | 130 | 0.06 | 18.7 | 5% | 24% | 36.5 | 0.5 | 0.7 |

Example 5

Figure 6:
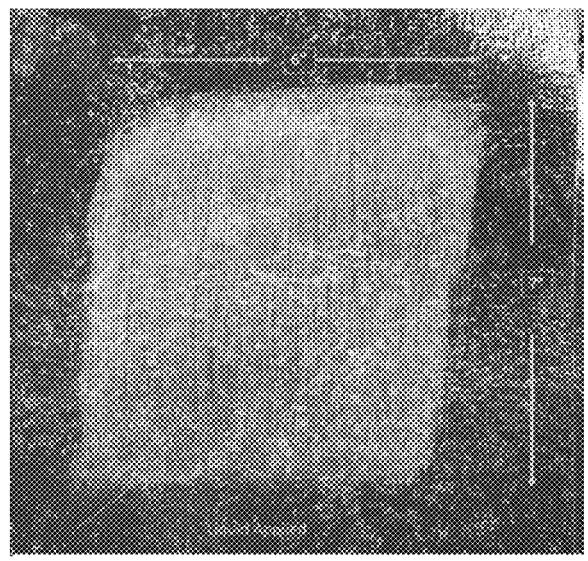
FIG. 6 is a photograph of a sample surface comprising graphene, according to some embodiments of the present disclosure.

8 mg of graphene was first dispersed in 0.2 gm of isopropyl alcohol under agitation to obtain a uniform mixture. The mixture was then applied to an asphaltic substrate prepared in the same way as in Example 1 using a Bristle brush. The total surface area applied was 42 in². Upon evaporation of the isopropyl alcohol, the resultant surface was coated with a uniform layer of graphene having a metallic, desirable surface appearance, see FIG. 6. The resultant surface had a total solar reflectance of 0.11 as compared to the uncoated area at 0.05. The coated surface has a CIE Lab color reading of L*=16.8, a*=0.6, and b*=2.1.

Example 6

A roofing grade asphalt was filled with calcium carbonate. The resulting asphalt filled coating included 35% by weight of the roofing grade asphalt and 65% by weight of the calcium carbonate. Unless otherwise provided herein, weight percentage is based on a total weight of the asphalt filled coating. A nonwoven fiberglass mat (mat weight of 1.6 lb/CSF) was impregnated with the asphalt filled coating to obtain a control asphaltic substrate. The control asphaltic substrate had a uniform thickness of 0.125 inches. When measured using a digital multimeter (Model 87V from Fluke), the conductivity of the control asphaltic substrate was measured to be 0 kΩ and thus was deemed non-conductive.

Example 7

An asphaltic substrate was prepared as detailed above in Example 6, except the asphaltic substrate was further coated with graphene powder. Specifically, the surface of the asphalt filled coating was coated with graphene powder, via direct brushing, at a loading rate of 0.1 gm/ft². The coating was applied at room temperature (e.g., about 25° C.). The resulting asphaltic substrate was uniformly coated with a thin layer of graphene. When measured using a digital multimeter (Model 87V from Fluke), the conductivity of the graphene-coated asphaltic substrate was measured to be 0 kΩ and thus was deemed non-conductive.

Example 8

A graphene-coated asphaltic substrate was prepared as detailed above in Example 7, except the graphene was applied to the surface of the asphalt filled coating under heat. Specifically, the uncoated asphaltic substrate was heated in a forced air oven to a surface temperature of about 130° F. Upon reaching the surface temperature, the graphene powder was applied, via direct brushing, at a loading rate of 0.4 gm/ft² to the surface of the asphalt filled coating of the asphaltic substrate. When measured using a digital multimeter (Model 87V from Fluke), the conductivity of the graphene-coated asphaltic substrate was measured to be 54 kΩ.

| Example | Graphene Amount (gm/ft²) | Application Temperature (° F.) | Conductivity (kΩ) |
|---|---|---|---|
| 6 | n/a | n/a | 0 |
| 7 | 0.1 | RT | 0 |
| 8 | 0.4 | 130 | 54 |

What is claimed is:

1. A roofing system comprising:
   a roofing substrate; and
   a plurality of roofing shingles on the roofing substrate,
      wherein each roofing shingle of the plurality of roofing shingles comprises:
         a substrate,
            wherein the substrate has a top surface;
         an asphalt filled coating on the top surface of the substrate,
            wherein the asphalt filled coating has a top surface; and
         a plurality of graphene particles covering at least a portion of the top surface of the asphalt filled coating,
            wherein the plurality of graphene particles covers at least 50% of the top surface of the asphalt filled coating.

2. The roofing system of claim 1, wherein the roofing substrate comprises at least one of a roof deck, an underlayment, or any combination thereof.

3. The roofing system of claim 1, wherein the substrate comprises at least one of a fiberglass, a polyester, or any combination thereof.

4. The roofing system of claim 1, wherein the asphalt filled coating comprises an asphalt and at least one filler.

5. The roofing system of claim 1, wherein the plurality of graphene particles covers 50% to 99% of the top surface of the asphalt filled coating.

6. The roofing system of claim 1, wherein the plurality of graphene particles is directly exposed to an environment.

7. The roofing system of claim 1,
   wherein the plurality of roofing shingles having a total solar reflectance that is greater than a total solar reflectance of a plurality of control roofing shingles;
   wherein the plurality of control roofing shingles does not comprise graphene;
   wherein the total solar reflectance is measured according to ASTM C1549.

8. The roofing system of claim 1, wherein the plurality of roofing shingles having a CIELAB color value comprising an L* value of 50 or less.

9. The roofing system of claim 8, wherein the CIELAB color value comprises an L value range of 0<L*<40.

10. A roofing shingle comprising:
a substrate,
  wherein the substrate has a top surface;
an asphalt filled coating on the top surface of the substrate,
  wherein the asphalt filled coating has a top surface; and
a plurality of graphene particles covering at least a portion of the top surface of the asphalt filled coating,
  wherein the plurality of graphene particles covers at least 50% of the top surface of the asphalt filled coating;
  wherein the roofing shingle is configured to be installed on a roofing substrate.

11. The roofing shingle of claim 10, wherein the plurality of graphene particles covers 50% to 99% of the top surface of the asphalt filled coating.

12. The roofing shingle of claim 10,
wherein the roofing shingle having a total solar reflectance that is greater than a total solar reflectance of a control roofing shingle;
  wherein the control roofing shingle does not comprise graphene;
  wherein the total solar reflectance is measured according to ASTM C1549.

13. The roofing shingle of claim 10, wherein the roofing shingle having a CIELAB color value comprising an L* value of 50 or less.

14. The roofing shingle of claim 13, wherein the CIELAB color value comprises an L value range of 0<L*<40.

15. The roofing shingle of claim 10, wherein the roofing substrate comprises at least one of a roof deck, an underlayment, or any combination thereof.

16. The roofing shingle of claim 10, wherein the substrate comprises at least one of a fiberglass, a polyester, or any combination thereof.

17. The roofing shingle of claim 10, wherein the asphalt filled coating comprises an asphalt and at least one filler.

18. The roofing shingle of claim 10, wherein the plurality of graphene particles is directly exposed to an environment.

19. The roofing system of claim 1, wherein the plurality of graphene particles is not present in the asphalt filled coating.

20. The roofing shingle of claim 10, wherein the plurality of graphene particles is not present in the asphalt filled coating.

* * * * *